US010321147B2

(12) United States Patent
Terada et al.

(10) Patent No.: US 10,321,147 B2
(45) Date of Patent: Jun. 11, 2019

(54) IMAGE ENCODING METHOD, IMAGE DECODING METHOD, IMAGE ENCODING DEVICE, IMAGE DECODING DEVICE, AND IMAGE ENCODING/DECODING DEVICE

(71) Applicant: Sun Patent Trust, New York, NY (US)

(72) Inventors: Kengo Terada, Osaka (JP); Takahiro Nishi, Nara (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 15/966,444

(22) Filed: Apr. 30, 2018

(65) Prior Publication Data
US 2018/0249169 A1 Aug. 30, 2018

Related U.S. Application Data

(63) Continuation of application No. 15/496,435, filed on Apr. 25, 2017, now Pat. No. 9,992,508, which is a continuation of application No. 14/730,552, filed on Jun. 4, 2015, now Pat. No. 9,706,213, which is a
(Continued)

(51) Int. Cl.
*H04N 19/503* (2014.01)
*H04N 19/31* (2014.01)
*H04N 19/105* (2014.01)
*H04N 19/172* (2014.01)
*H04N 19/187* (2014.01)
(Continued)

(52) U.S. Cl.
CPC ......... *H04N 19/503* (2014.11); *H04N 19/105* (2014.11); *H04N 19/159* (2014.11); *H04N 19/16* (2014.11); *H04N 19/172* (2014.11); *H04N 19/187* (2014.11); *H04N 19/31* (2014.11)

(58) Field of Classification Search
CPC .. H04N 19/503; H04N 19/105; H04N 19/159; H04N 19/16; H04N 19/172; H04N 19/187; H04N 19/31
See application file for complete search history.

(56) References Cited

U.S. PATENT DOCUMENTS

2014/0085415 A1* 3/2014 Bici ................. H04N 19/00769
348/43
2016/0165251 A1* 6/2016 Deshpande .......... H04N 19/597
375/240.02

FOREIGN PATENT DOCUMENTS

WO 2014/103600 7/2014

OTHER PUBLICATIONS

International Search Report issued in International Application No. PCT/JP2014/003354 dated Sep. 16, 2014.
(Continued)

*Primary Examiner* — Maria E Vazquez Colon
(74) *Attorney, Agent, or Firm* — Wenderoth, Lind & Ponack, L.L.P.

(57) ABSTRACT

An image encoding method includes: determining whether a current picture is a TSA picture or a trailing picture; and encoding a plurality of pictures according to whether the current picture is the TSA picture or a trailing picture. The determining includes: determining the current picture to be the TSA picture when the current picture does not belong to the highest layer and corresponds to a first field, and determining the current picture to be the trailing picture when the current picture belongs to the highest layer or corresponds to a second field.

4 Claims, 34 Drawing Sheets

Related U.S. Application Data continuation of application No. PCT/JP2014/003354, filed on Jun. 23, 2014.

(60) Provisional application No. 61/843,076, filed on Jul. 5, 2013.

(51) Int. Cl.
*H04N 19/159* (2014.01)
*H04N 19/16* (2014.01)

(56) References Cited

OTHER PUBLICATIONS

Benjamin Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, JCTVC-L 1003_v34.doc, http://phenix.it-sudparis.eu/jct/doc_end_user/documents/12_Geneva/wg11/JCTVC -L1003-v34.zip.

Hendry et al., "AHG 9: On non-referenced TSA and STSA NAL units", Joint Collaborative Team on Video Coding (JCT-VC) of ITU-T SG16 WP3 and ISO/IEC JTC1/SC29/WG11 11th Meeting: Shanghai, CN, Oct. 10-19, 2012, JCTVC-K0164, pp. 1-6.

Takahiro Nishi, "New Image Coding Technology, 1. HEVC (MPEG-H/ITU-T H. 265) Technical Description, 1-6. Structure and Function of Bitstream", Journal of the Institute of Image Information and Television Engineers, vol. 67, No. 7, pp. 549-552 Published on Jul. 1, 2013—with entire English translation.

\* cited by examiner

FIG. 23

| Video stream (PID=0x1011, Primary video) | Audio stream (PID=0x1100) | Audio stream (PID=0x1101) | Presentation graphics stream (PID=0x1200) | Presentation graphics stream (PID=0x1201) | Interactive graphics stream (PID=0x1400) | Video stream (PID=0x1B00, Secondary video) | Video stream (PID=0x1B01, Secondary video) |
|---|---|---|---|---|---|---|---|

FIG. 26
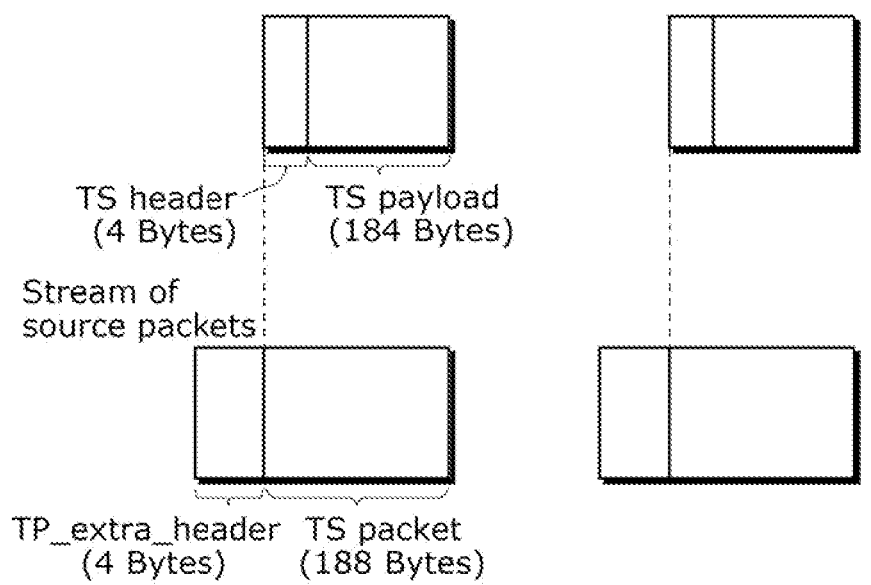
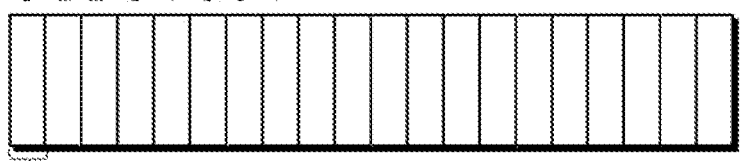

FIG. 34

| Corresponding standard | Driving frequency |
|---|---|
| MPEG-4 AVC | 500 MHz |
| MPEG-2 | 350 MHz |
| ⋮ | ⋮ |

IMAGE ENCODING METHOD, IMAGE DECODING METHOD, IMAGE ENCODING DEVICE, IMAGE DECODING DEVICE, AND IMAGE ENCODING/DECODING DEVICE

CROSS REFERENCE TO RELATED APPLICATIONS

This application is a continuation of application Ser. No. 14/730,552 filed on Jun. 4, 2015, which is a continuation application of PCT International Application No. PCT/JP2014/003354 filed on Jun. 23, 2014, designating the United States of America, which is based on and claims priority of U.S. Provisional Patent Application No. 61/843,076 filed on Jul. 5, 2013. The entire disclosures of the above-identified applications, including the specifications, drawings and claims are incorporated herein by reference in their entirety.

FIELD

One or more exemplary embodiments disclosed herein relate generally to an image encoding method etc. for encoding a plurality of pictures classified into a plurality of layers.

BACKGROUND

Non Patent Literature 1 (NPL) discloses a technique relating to an image encoding method for encoding images (including moving images) or an image decoding method for decoding images.

CITATION LIST

Non Patent Literature

Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eu/jct/doc_end_user/documents/12_Gene va/wg11/JCTVC-L1003-v34.zip

SUMMARY

Technical Problem

However, inefficient processes may be performed in the conventional image encoding or decoding method.

In view of this, one non-limiting and exemplary embodiment provides an image encoding method for encoding images efficiently or an image decoding method for decoding images efficiently.

Solution to Problem

In one general aspect, the techniques disclosed here feature an image encoding method for encoding, on a per field basis, a plurality of pictures classified into a plurality of layers for which reference from a picture belonging to a higher layer to a picture belonging to a lower layer is prohibited, the plurality of pictures including at least one picture that is encoded as a temporal sub-layer access (TSA) picture for which predetermined reference is prohibited, the image encoding method including: determining whether a current picture included in the plurality of pictures is the TSA picture or a trailing picture for which the predetermined reference is permitted; and encoding the plurality of pictures according to whether the current picture is the TSA picture or the trailing picture, wherein the determining includes: determining the current picture to be the TSA picture when the current picture does not belong to a highest layer in the plurality of layers and corresponds to a first field that is encoded earlier than a second field in a pair of fields in a frame; and determining the current picture to be the trailing picture when the current picture belongs to the highest layer or corresponds to the second field that is encoded later than the first field in the pair of fields.

These general and specific aspects may be implemented using a system, a device, an integrated circuit, a computer program, or a non-transitory computer-readable recording medium such as a CD-ROM, or any combination of systems, devices, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The image encoding method, the image decoding method, etc. according to one or more exemplary embodiments or features disclosed herein achieve efficient image encoding or decoding.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 23 illustrates a structure of multiplexed data.

FIG. 26 shows a structure of TS packets and source packets in the multiplexed data.

FIG. 34 shows an example of a look-up table in which video data standards are associated with driving frequencies.

DESCRIPTION OF EMBODIMENTS

Underlying Knowledge Forming Basis of the Present Disclosure

The Inventors found the following problems related to the image encoding device which encodes images and the image decoding device which decodes images, described in the "Background" section. These problems are described in detail below.

In recent years, significant technical advancement in digital video devices have increased cases of compression-coding video signals (of a plurality of pictures arranged in temporal order) input from video cameras or television tuners and recording them onto recording media such as DVDs, hard disks, or the like. There is the H.264/AVC (MPEG-4 AVC) as a conventional image coding standard.

The high efficiency video coding (HEVC) standard is currently being considered as the next-generation standard (Non Patent Literature 1).

Figure 1:
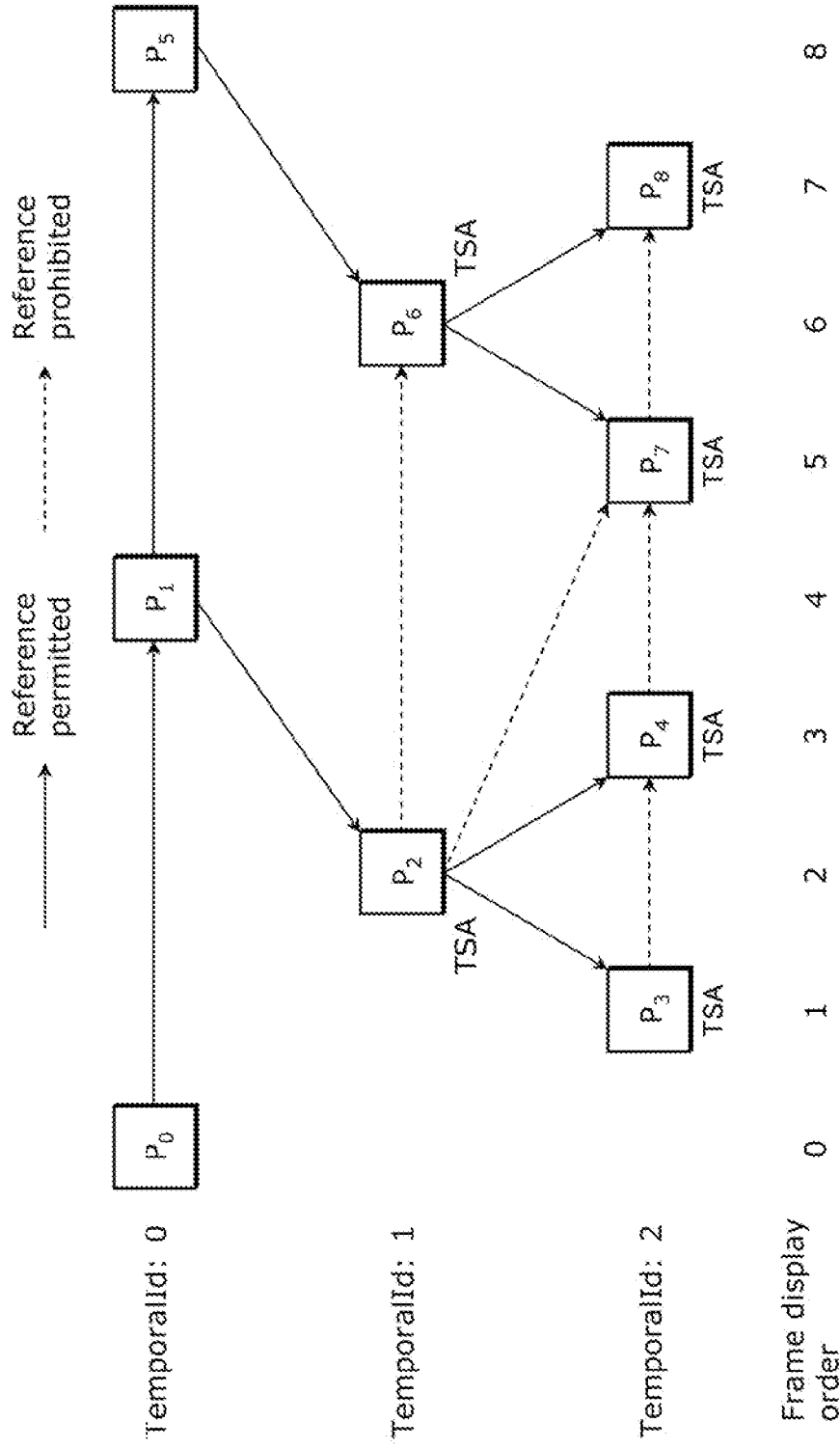
FIG. 1 is a diagram illustrating constraint in reference between pictures (frames) classified into layers.

According to the current HEVC standard (Non Patent Literature 1), it is possible to classify pictures as illustrated in FIG. 1 and encode the pictures, with picture reference relationships being restricted. In FIG. 1, $P_x$ denotes a picture, and x in $P_x$ denotes a coding (decoding) order. In FIG. 1, picture layers are illustrated in the vertical direction. TemporalId is an identifier of a layer, and a larger numerical value indicates a deeper layer. The display order of frames is illustrated in the vertical direction (the display order is an input order in the image encoding device, and is an output order in the image decoding device). In the example of FIG. 1, one frame corresponds to one picture.

A solid arrow indicates availability (reference permission) of reference from a picture indicated by the head (the ending point) of the arrow to a picture indicated by the bottom (the starting point) of the arrow. In FIG. 1, for example, $P_1$ can refer to $P_0$. In the example of FIG. 1, $P_0$ can be used to perform inter prediction on $P_1$, and a prediction image of $P_1$ can be generated referring to $P_0$.

In addition to the reference in the diagram, when a first picture can refer to a second picture, and the second picture can refer to a third picture, the first picture can refer to the third picture. For example, $P_6$ can refer to not only $P_5$ but also $P_1$ that can be referred to by $P_5$, and $P_0$ that can be referred to by $P_1$.

A broken arrow indicates reference prohibition. In FIG. 1, for example, $P_6$ cannot refer to $P_2$. In addition to the reference prohibition in the diagram, when the TemporalId of the second picture is larger than the TemporalId of the first picture, reference from the first picture to the second picture is prohibited. For example, $P_6$ cannot refer to $P_4$.

Here, reference from a picture belonging to a higher layer (a shallower layer) to a picture belonging to a lower layer (a deeper layer) is prohibited. Here, when reference from a picture belonging to a first layer to a picture belonging to a second layer is prohibited, the first layer is the higher layer (shallower layer) and the second layer is the lower layer (deeper layer).

The purpose of classifying the pictures and encoding the pictures is to provide a moving image (video) temporal scalability. For example, in FIG. 1, a moving image of 30 fps (frame per second) can be obtained by decoding only a picture having TemporalId of 0 and a picture having TemporalId of 1 are decoded from a bitstream of 60 fps corresponding to TemporalId ranging from 0 to 2.

When the TemporalId of a picture PicX is 1 or larger, reference from any of pictures composed of the picture PicX and the following pictures in coding (decoding) order to an encoded (decoded) picture having TemporalId larger than or equal to the TemporalId of the picture PicX is prohibited. The picture PicX is included in the pictures composed of the picture PicX and the following pictures in coding (decoding) order.

For example, in FIG. 1, $P_4$ having TemporalId of 2 cannot refer to any encoded (decoded) picture having TemporalId of 2 or larger with reference being prohibited. More specifically, reference from $P_4$ to $P_3$ is prohibited. Likewise, $P_6$ having TemporalId of 1 and encoded (decoded) immediately before $P_7$ cannot refer to any encoded (decoded) picture having TemporalId of 1 or larger with reference being prohibited. More specifically, reference from $P_7$ to $P_2$ is prohibited.

By restricting reference relationships, it is possible to reduce the number of reference pictures to be decoded when reproducing a stream starting at a point other than the starting point in the stream. For example, in FIG. 1, when reference relationships are not restricted (in other words, $P_7$ refers to $P_4$, and $P_4$ refers to $P_2$), pictures are decoded in this order of $P_0$, $P_1$, $P_2$, $P_4$, $P_5$, $P_6$, and $P_7$ when reproducing $P_7$. When reference relationships are restricted, pictures are decoded in this order of $P_0$, $P_1$, $P_5$, $P_6$, and $P_7$. In this case, $P_2$ and $P_4$ that are reference pictures do not need to be decoded.

Constraint in picture reference relationship is controlled by a flag what is called sps_temporal_id_nesting_flag. When sps_temporal_id_nesting_flag is 1, the picture reference relationship is restricted as described above. When sps_temporal_id_nesting_flag is 0, no picture reference relationship is restricted, and for example, $P_7$ may refer to $P_4$ in FIG. 1.

For example, when sps_temporal_id_nesting_flag is 1, a picture having TemporalId of 1 or larger is encoded (decoded) as a temporal sub-layer access (TSA) picture. When a picture PicX is a TSA picture, reference from any of pictures composed of the picture PicX and the following pictures in coding (decoding) order to an encoded (decoded) picture having TemporalId larger than or equal to the TemporalId of the picture PicX is prohibited. In this way, reference relationships are restricted as described above.

However, when reference relationships are restricted as described above and the pictures are encoded (decoded) on a per field basis, reference between fields having a high correlation may be prohibited. Here, a field structure is a picture structure of a kind for use in encoding (decoding). For example, formats for use in image encoding (decoding) include a frame format and a field format. Stated differently, picture structures for use in image encoding (decoding) include the frame structure and the field structure.

Figure 2:
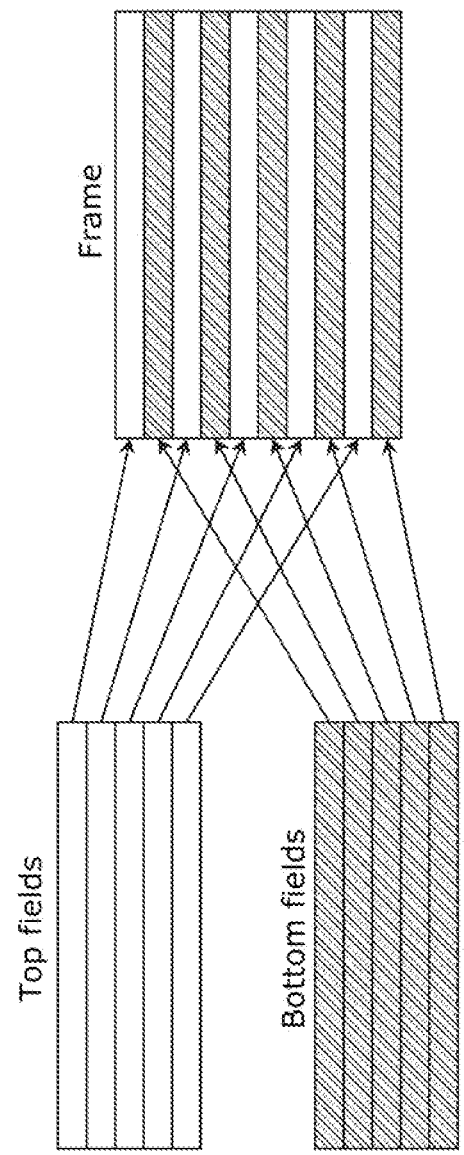
FIG. 2 is a diagram illustrating relationships between fields and a frame.

FIG. 2 is a diagram illustrating relationships between fields and a frame. As illustrated in FIG. 2, the frame includes top fields and bottom fields.

When an image is encoded (decoded) on a per frame basis, the integral frame composed of the top fields and the bottom fields is encoded (decoded). In this case, one frame corresponds to one picture. When an image is encoded (decoded) on a per field basis, the top fields and the bottom fields are separately encoded (decoded). In this case, each field (one field) corresponds to one picture.

Figure 3:
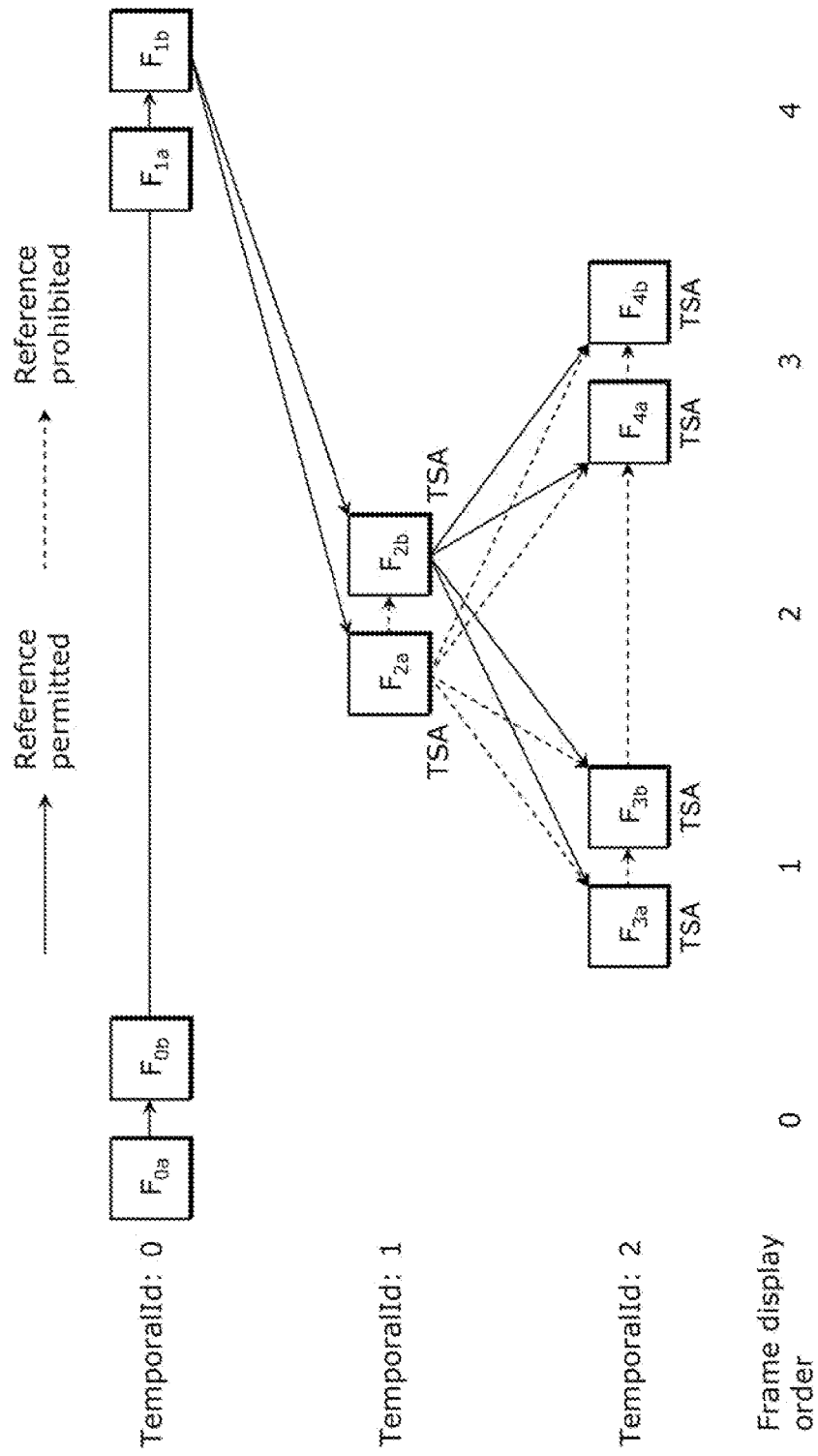
FIG. 3 is a diagram illustrating constraint in reference between pictures (fields) classified into layers.

FIG. 3 is a diagram illustrating reference constraint in the case where fields are classified into layers. In FIG. 3, $F_{xa}$ and $F_{xb}$ denote fields, and x denotes a coding (decoding) order. $F_{xa}$ denotes one of a top field and a bottom field, and $F_{xb}$ denotes the other field (the bottom field or the top field).

As illustrated in FIG. 3, in the encoding (decoding) of $F_{2b}$ having TemporalId of 1 and the following fields, reference to an encoded (decoded) picture having TemporalId of 1 or larger is prohibited with reference being prohibited due to constraint in reference relationship. For this reason, $F_{2b}$ and $F_{3a}$, $F_{3b}$, $F_{4a}$, $F_{4b}$, and $F_{2a}$ cannot be referred to. Likewise, $F_{3b}$ and $F_{4b}$ cannot refer to $F_{3a}$ and $F_{4a}$, respectively. One of the fields (the top field or the bottom field) cannot refer to the other field (the bottom field or the top field).

Since reference between fields belonging to the same frame and thus are temporally identical or close to each other is prohibited, which reduces the accuracy of a prediction image and reduces a compression efficiency. Reference from a picture having TemporalId of 2 to a previously encoded (decoded) field having TemporalId of 1 is prohibited. This reference constraint reduces the accuracy of the prediction image and reduces a compression efficiency.

For example, in the case of a still image, $F_{2a}$ and $F_{3a}$ indicate the same image, and reference from $F_{3a}$ to $F_{2a}$ is prohibited, and thus a prediction image is generated from another image. This reduces the accuracy of the prediction image and reduces a compression efficiency.

In one general aspect, the techniques disclosed here feature an image encoding method for encoding, on a per field basis, a plurality of pictures classified into a plurality of layers for which reference from a picture belonging to a higher layer to a picture belonging to a lower layer is prohibited, the plurality of pictures including at least one picture that is encoded as a temporal sub-layer access (TSA) picture for which predetermined reference is prohibited, the image encoding method including: determining whether a current picture included in the plurality of pictures is the TSA picture or a trailing picture for which the predetermined reference is permitted; and encoding the plurality of pictures according to whether the current picture is the TSA picture or the trailing picture, wherein the determining includes: determining the current picture to be the TSA picture when the current picture does not belong to a highest layer in the plurality of layers and corresponds to a first field that is encoded earlier than a second field in a pair of fields in a frame; and determining the current picture to be the trailing picture when the current picture belongs to the highest layer or corresponds to the second field that is encoded later than the first field in the pair of fields.

In this way, the referable picture is appropriately restricted when the plurality of pictures classified into the plurality of layers are encoded on a per field basis. For this reason, it is possible to reduce the amount of processing and a memory capacity, and thus to reduce decrease in prediction accuracy and in compression efficiency.

For example, the encoding may include: encoding an unencoded picture with the predetermined reference from the unencoded picture to an encoded picture being prohibited, when the current picture is determined to be the TSA picture, the unencoded picture being the current picture or a picture following the current picture in coding order in the plurality of pictures, the encoded picture being a picture preceding the current picture in coding order in the plurality of pictures and belonging to a layer to which the current picture belongs or a layer lower than the layer to which the current picture belongs; and encoding the unencoded picture with the predetermined reference being permitted, when the current picture is determined to be the trailing picture.

In this way, the reference to the picture encoded before the TSA picture is restricted. Stated differently, the referable picture is appropriately restricted.

In addition, for example, the determining may include: determining the current picture to be the TSA picture when the current picture does not belong to the highest layer and corresponds to the first field which is a top field; and determining the current picture to be the trailing picture when the current picture belongs to the highest layer or corresponds to the second field which is a bottom field.

In this way, in the layers except the highest layer, each of the top fields is determined to be a TSA picture and each of the bottom fields is determined to be a trailing picture. Accordingly, the constraint in reference to the top fields is released.

In addition, for example, the determining may include: determining the current picture to be the TSA picture when the current picture does not belong to the highest layer and corresponds to the first field that immediately precedes the second field in coding order; and determining the current picture to be the trailing picture when the current picture belongs to the highest layer or corresponds to the second field that immediately follows the first field in coding order.

In this way, the constraint in reference to the first field encoded immediately before the second field is released.

In addition, for example, the image encoding method may further include encoding a picture type indicating whether the current picture is the TSA picture or the trailing picture.

In this way, for example, it is possible to notify the decoding device of the picture type indicating whether the current picture is the TSA picture or the trailing picture.

In one general aspect, the techniques disclosed here feature an image decoding method for decoding, on a per field basis, a plurality of pictures classified into a plurality of layers for which reference from a picture belonging to a higher layer to a picture belonging to a lower layer is prohibited, the plurality of pictures including at least one picture that is decoded as a temporal sub-layer access (TSA) picture for which predetermined reference is prohibited, the image decoding method including: identifying whether a current picture included in the plurality of pictures is the TSA picture or a trailing picture for which the predetermined reference is permitted; and decoding the plurality of pictures according to whether the current picture is the TSA picture or the trailing picture, wherein the identifying includes: identifying the current picture as the TSA picture when the current picture does not belong to a highest layer in the plurality of layers and corresponds to a first field that is decoded earlier than a second field in a pair of fields in a frame; and identifying the current picture as the trailing picture when the current picture belongs to the highest layer or corresponds to the second field that is decoded later than the first field in the pair of fields.

In this way, the referable picture is appropriately restricted when the plurality of pictures classified into the plurality of layers are decoded on a per field basis. For this reason, it is possible to reduce the amount of processing and a memory capacity, and thus to reduce decrease in prediction accuracy and in compression efficiency.

For example, the decoding may include: decoding an undecoded picture with the predetermined reference from the undecoded picture to a decoded picture being prohibited, when the current picture is identified as the TSA picture, the undecoded picture being the current picture or a picture following the current picture in decoding order in the plurality of pictures, the decoded picture being a picture preceding the current picture in decoding order in the plurality of pictures and belonging to a layer to which the current picture belongs or a layer lower than the layer to which the current picture belongs; and decoding the undecoded picture with the predetermined reference being permitted, when the current picture is identified as the trailing picture.

In this way, the reference to the picture decoded before the TSA picture is restricted. Stated differently, the referable picture is appropriately restricted.

In addition, for example, the identifying may include: identifying the current picture as the TSA picture when the current picture does not belong to the highest layer and corresponds to the first field which is a top field; and identifying the current picture as the trailing picture when the current picture belongs to the highest layer or corresponds to the second field which is a bottom field.

In this way, in the layers except the highest layer, each of the top fields is identified as a TSA picture and each of the bottom fields is identified as a trailing picture. Accordingly, the constraint in reference to the top fields is released.

In addition, for example, the identifying may include: identifying the current picture as the TSA picture when the current picture does not belong to the highest layer and corresponds to the first field that immediately precedes the second field in decoding order; and identifying the current picture as the trailing picture when the current picture belongs to the highest layer or corresponds to the second field that immediately follows the first field in decoding order.

In this way, the constraint in reference to the first field decoded immediately before the second field is released.

In addition, for example, the image decoding method may further include decoding a picture type indicating whether the current picture is the TSA picture or the trailing picture, wherein the identifying may include: identifying the current picture as the TSA picture according to the picture type decoded in the decoding, when the current picture does not belong to the highest layer and corresponds to the first field; and identifying the current picture as the trailing picture according to the picture type decoded in the decoding, when the current picture belongs to the highest layer or corresponds to the second field.

In this way, for example, it is possible to appropriately identify whether the current picture is the TSA picture or the trailing picture according to the picture type notified by the encoding device.

In addition, for example, the image decoding method may further include checking whether the picture type decoded in the decoding is correct, wherein the checking may include: checking that the picture type decoded in the decoding is correct by checking that the picture type indicates the current picture as the TSA picture when the current picture does not belong to the highest layer and corresponds to the first field; and checking that the picture type decoded in the decoding is correct by checking that the picture type indicates the current picture as the trailing picture when the current picture belongs to the highest layer or corresponds to the second field.

In this way, the appropriateness of the decoded picture type is checked. Accordingly, decoding operations can be executed according to the appropriate picture type.

In addition, for example, the checking may further include controlling the decoding of the plurality of pictures so as to prevent decoding of the current picture when the picture type decoded in the decoding of the picture type is incorrect.

In this way, when the decoded picture type is inappropriate, occurrence of an unexpected trouble is prevented.

These general and specific aspects may be implemented using a system, a device, an integrated circuit, a computer program, or a non-transitory computer-readable recording medium such as a CD-ROM, or any combination of systems, devices, integrated circuits, computer programs, or computer-readable recording media.

Hereinafter, certain embodiments are described in detail with reference to the Drawings. Each of the embodiments described below illustrates a general or specific example. The numerical values, shapes, materials, constituent elements, the arrangement and connection of the constituent elements, steps, the processing order of the steps etc. shown in the following embodiments are mere examples, and therefore do not limit the scope of the claims. In addition, among the constituent elements in the following exemplary embodiments, constituent elements not recited in any one of the independent claims which define the most generic concept are described as arbitrary constituent elements.

Hereinafter, coding may be used to mean encoding.

Embodiment 1

Overall Configuration

Figure 4:
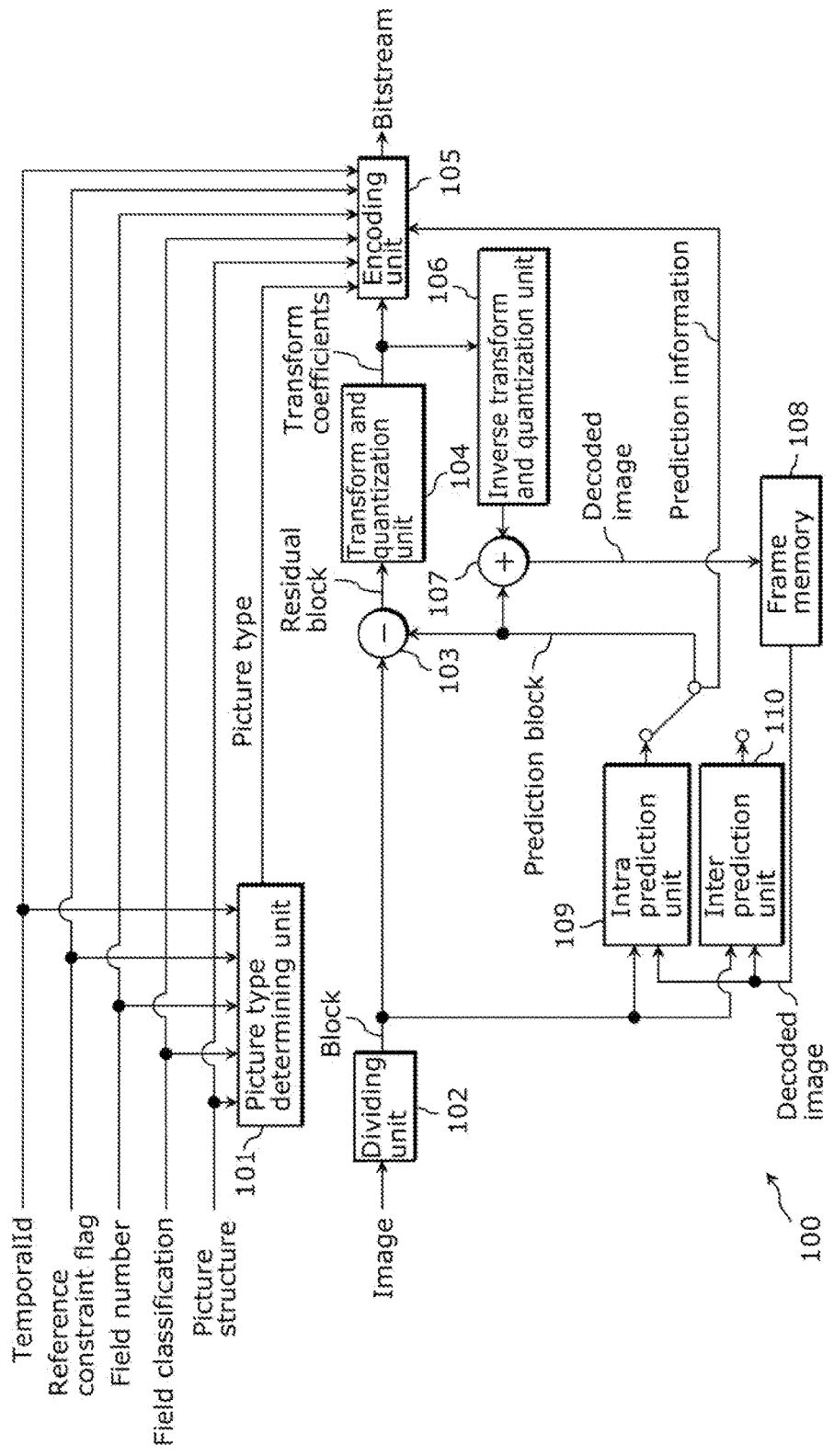
FIG. 4 is a block diagram of an image encoding device according to Embodiment 1.

FIG. 4 illustrates a configuration of an image encoding device according to this embodiment. The image encoding device 100 includes: a picture type determining unit 101; a dividing unit 102; a subtractor 103; a transform and quantization unit 104; an encoding unit 105; an inverse transform and quantization unit 106; an adder 107; a frame memory 108; an intra prediction unit 109; and an inter prediction unit 110. For example, these constituent elements are exclusive or general-purpose circuitry.

Operations (Overall)

Figure 5:
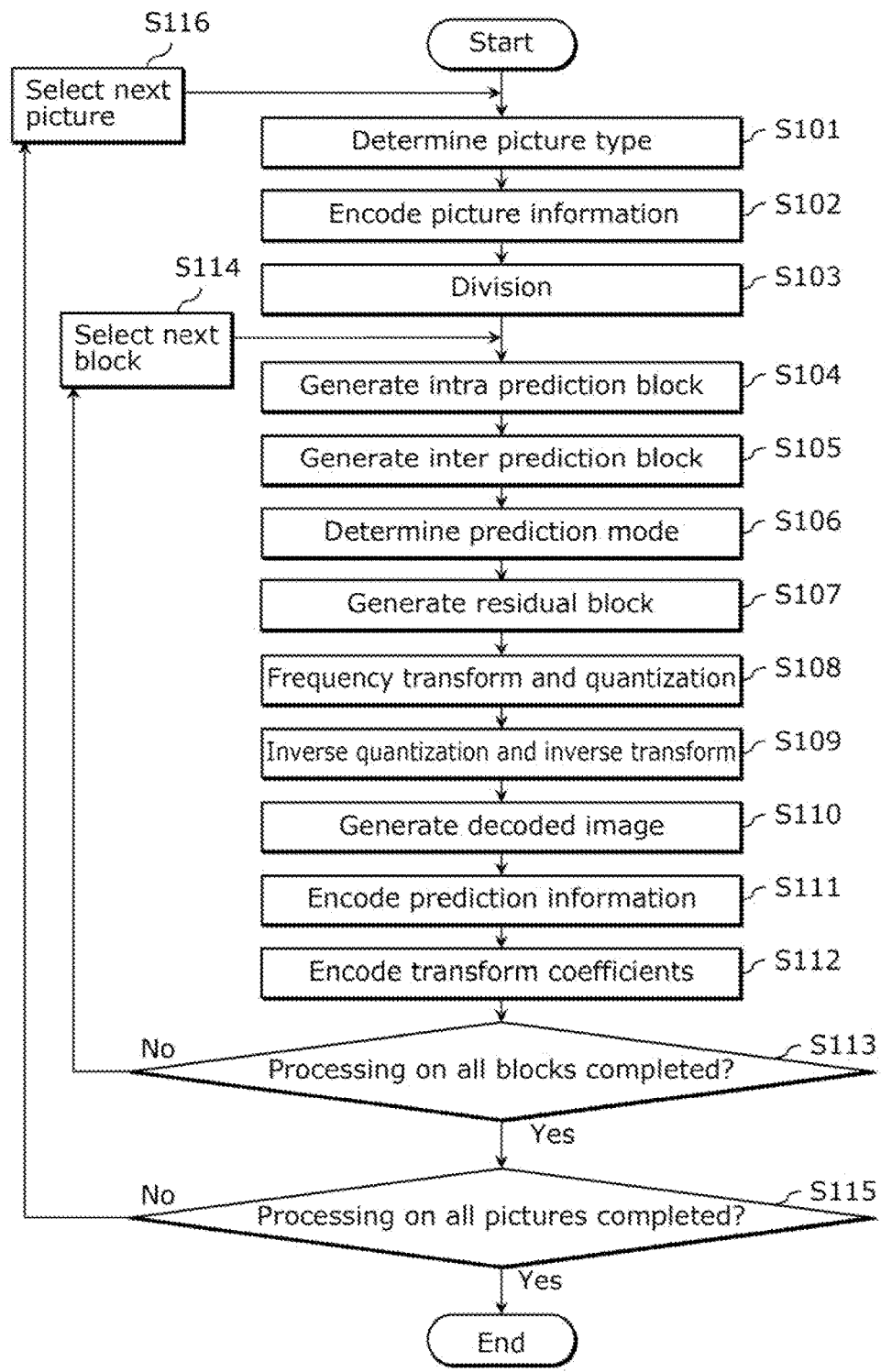
FIG. 5 is a flowchart of an image encoding device according to Embodiment 1.

Next, an overall encoding flow is described with reference to FIG. 5.

First, the picture type determining unit 101 determines a picture type of a current picture to be encoded (S101). This is described in detail later. It is to be noted that a picture type indicates whether a picture is a temporal sub-layer access (TSA) picture or a trailing picture.

Stated differently, the picture type corresponds to either the TSA picture or the trailing picture. The picture type may correspond to another picture. The other picture is, for example, what is called a leading picture. The picture type may correspond either an I-picture, a P-picture, or a B-picture. The picture type may also correspond to a combination of a plurality of picture types.

Next, the encoding unit 105 encodes picture information including a reference constraint flag, a picture structure, a field number, TemporalId, a field classification, a picture type, etc. (S102).

Here, the reference constraint flag is a flag indicating whether or not a reference relationship between pictures is restricted. The picture structure is either a frame structure or a field structure, and indicates whether an input image has a frame structure or a field structure. It is to be noted that information indicating a picture structure may be simply represented as a picture structure. The field number is a number corresponding to a display order of a field. The field number may be a picture number that is the number corresponding to the display order of a picture. TemporalId is an identifier indicating a layer to which a current picture to be encoded belongs.

The field classification is a classification (identifier) indicating whether a current field to be encoded is a first field or a second field. The first field is a field that is encoded earlier than a second field in a pair of fields in a frame, and the second field is a field that is encoded later than the second field in the pair of fields in the frame. In FIG. 3, $F_{xa}$ is a first field, and $F_{xb}$ is a second field.

Next, the dividing unit 102 divides an input image into a plurality of blocks (S103). For example, each of the blocks is also referred to as a coding unit in a coding standard.

Next, the intra prediction unit 109 and the inter prediction unit 110 each derives prediction information including a prediction block, a cost, a prediction mode, etc. in a corresponding one of intra prediction and inter prediction (S104, S105). The intra prediction unit 109 and the inter prediction unit 110 determine the prediction mode and the prediction block based on the derived prediction information (S106).

Next, the subtractor 103 obtains a difference between the prediction block and the original block to generate a residual block (S107). The transform and quantization unit 104 performs frequency transform and quantization on the residual block (S108). Next, the inverse quantization unit 106 performs inverse quantization and inverse transform to reconstruct the residual block (S109). Next, the adder 107 adds (sums) the residual block and the prediction block to generate a decoded block (decoded image) (S110).

Next, the encoding unit 105 encodes the prediction information (S111). In addition, the encoding unit 105 encodes transform coefficients generated through the frequency transform and quantization (S112).

Next, when processing on all of the blocks has not yet been completed (No in S113), the image encoding device 100 selects a next block (S114). The image encoding device 100 repeats the above described processes (S104 to S112) until processing on all of the blocks in the picture has been completed. In addition, when processing on all of the pictures has not yet been completed (No in S115), the image encoding device 100 selects a next picture (S116). Next, the image encoding device 100 repeats the above described processes (S101 to S114) until processing on all of the pictures has been completed.

Hereinafter, the picture type determining unit 101 is mainly described in detail.

Operations (Determination of Picture Types)

Figure 6:
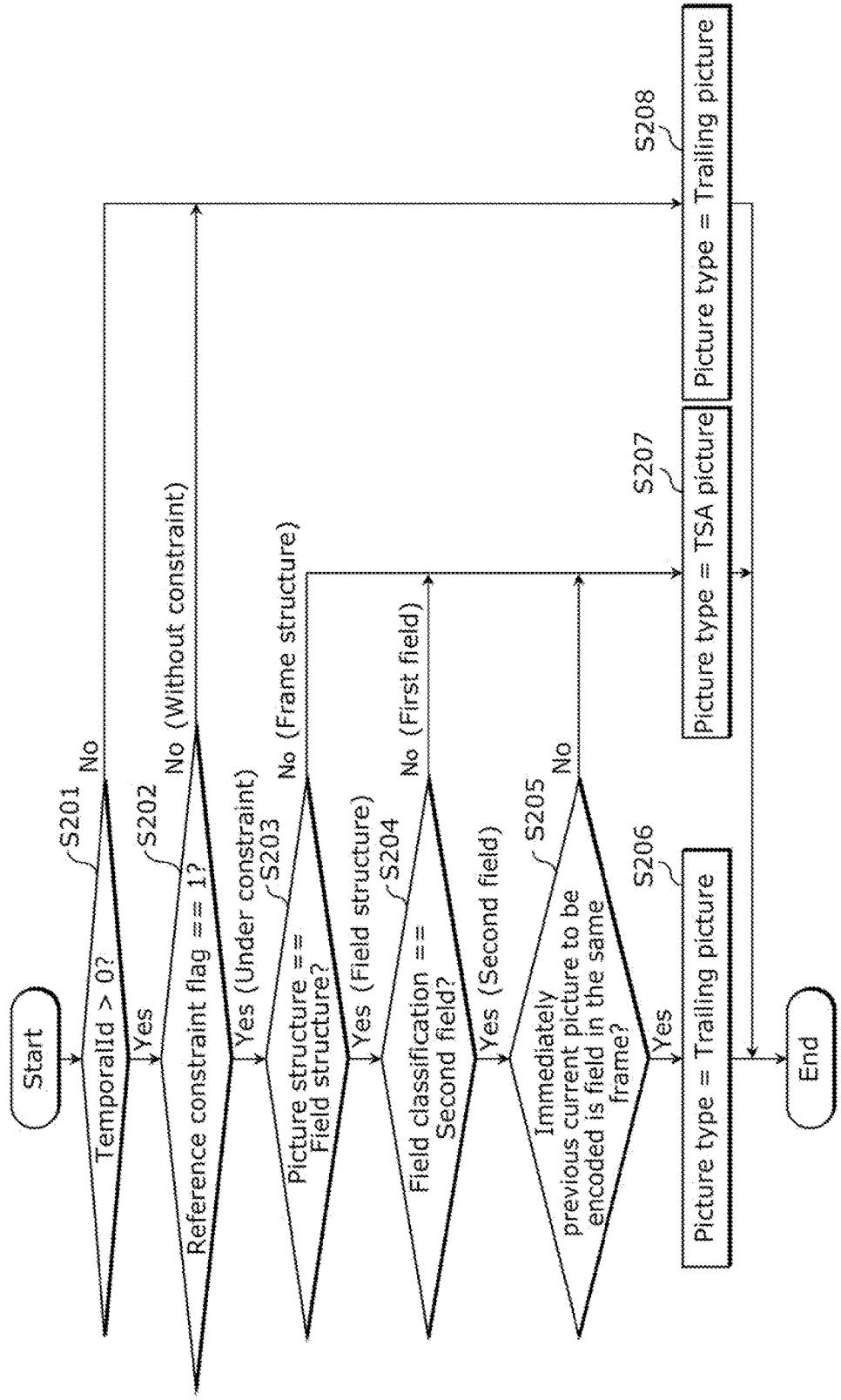
FIG. 6 is a flowchart of operations performed by a picture type determining unit according to Embodiment 1.

Next, a picture type determination flow is described with reference to FIG. 6. Here, a picture type is determined for each picture. Specifically, the picture type is determined for each of access units which corresponds to the picture. A picture encoded on a per field basis corresponds to fields. On the other hand, a picture encoded in frame structure corresponds to a frame.

First, when TemporalId is 0 (No in S201), or when a reference constraint flag is 0 (No in S202), the picture type determining unit 101 determines the picture type of a current picture to be encoded is a trailing picture (S208). In other words, in each of these cases, the picture type determining unit 101 determines that the current picture to be encoded is a trailing picture. Here, the case in which the reference constraint flag is 0 means that no reference is restricted.

Next, when the picture structure is the frame structure (No in S203), the picture type determining unit 101 determines that the picture type of the current picture to be encoded is a TSA picture (S207). In other words, in each of these cases, the picture type determining unit 101 determines that the current picture to be encoded is a TSA picture.

Next, when the field classification indicates a first field (No in S204), the picture type determining unit 101 determines that the current picture to be encoded is a TSA picture (S207).

Next, when the field that precedes by one the current field to be encoded in coding order is a first field in a frame (Yes in S205), the picture type determining unit 101 determines that the current picture to be encoded is a trailing picture (S206). Otherwise (No in S205), the picture type determining unit 101 determines that the current picture to be encoded is a TSA picture (S207). Whether or not the field that precedes by one the current picture to be encoded in coding order is a first field is determined based on a field number indicating the number corresponding to the display order of the preceding field.

As described above, the TSA picture is a picture with reference being prohibited from any of pictures composed of the TSA picture and the following pictures in coding (decoding) order to an encoded (decoded) picture having TemporalId larger than or equal to the TemporalId of the TSA picture. The trailing picture is a picture with reference permitted from any of pictures composed of the trailing picture and the following pictures in coding (decoding)

order to an encoded (decoded) picture having TemporalId larger than or equal to the TemporalId of the trailing picture.

Effects

Hereinafter, in this embodiment, when reference is restricted, reference can be made from one of the fields (either the top field or the bottom field) to the other field (the bottom field or the top field). This increases a prediction accuracy. In other words, the image encoding device 100 according to this embodiment is capable of achieving both constraint of reference relationship and reduction in decrease in compression efficiency.

Figure 7:
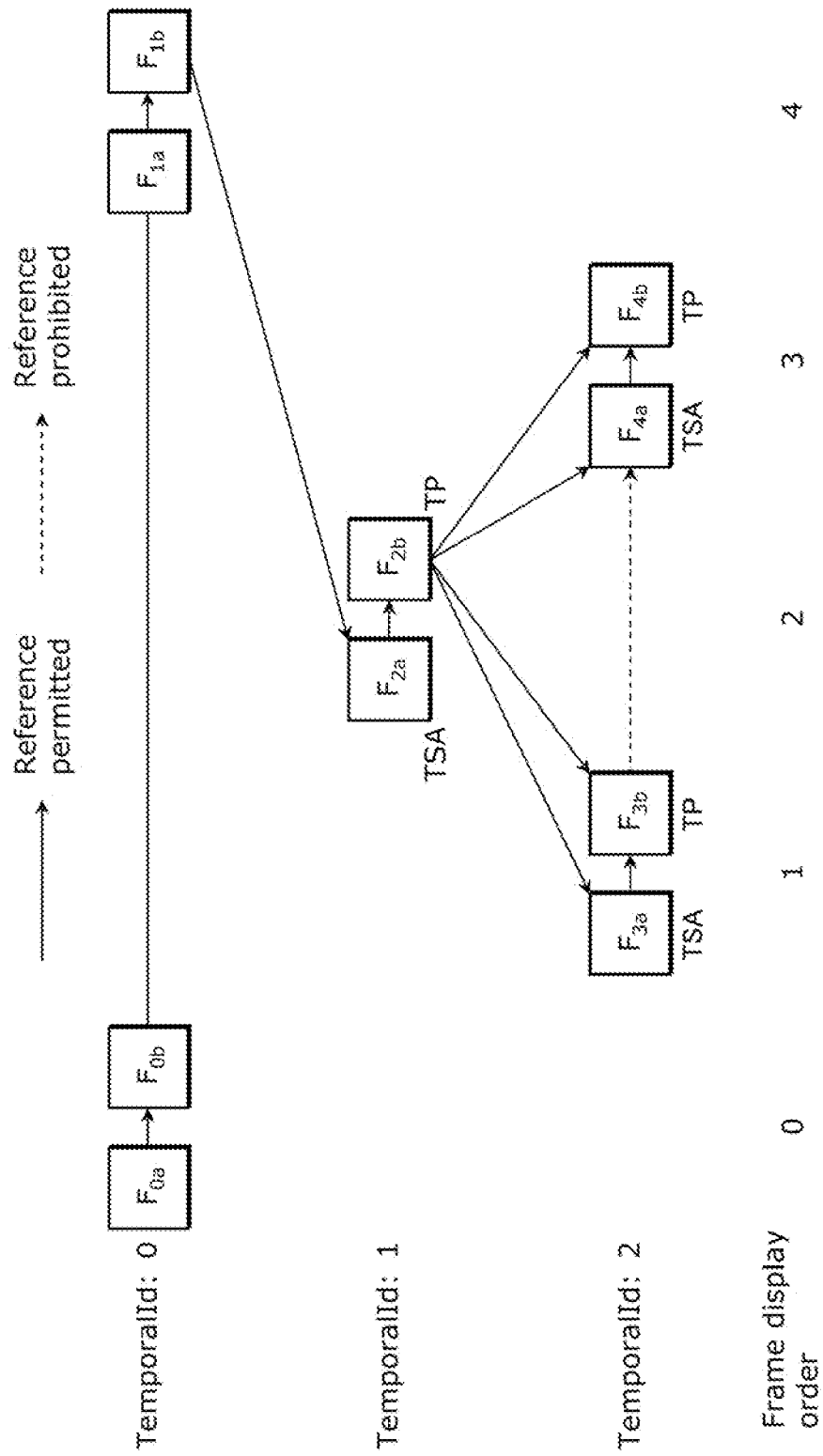
FIG. 7 is a diagram illustrating constraint in reference between pictures (fields) according to Embodiment 1.

More specifically, in this embodiment, reference relationships in FIG. 3 are modified to reference relationships in FIG. 7. In FIG. 7, a second field is not a TSA picture but a trailing picture (TP). Accordingly, reference can be made to a field temporally identical or close thereto in the same frame. For example, reference from $F_{2b}$ to $F_{2a}$ can be made. This increases a prediction accuracy.

In addition, reference to a first field belonging to another layer can be made. For example, reference from $F_{3a}$ to $F_{2a}$ can be made. This increases a prediction accuracy. In addition, both increase in prediction accuracy and constraint in reference relationship are achieved.

Examples of prohibited reference include reference from any of fields composed of a field $F_{2a}$ having TemporalId of 1 and the following fields to be encoded (decoded) after $F_{2a}$ to a field encoded (decoded) prior to $F_{2a}$ and having TemporalId of 1 or larger. Accordingly, in reproduction starting with a field other than the starting field in a picture, it is possible to reduce the number of reference pictures to be decoded.

By means of the image encoding device 100 encoding the reference constraint flag, the image decoding device can find the reference constraint before decoding of the field is started. For this reason, the image decoding device can skip a process of decoding a field that is not referred to by any field. Accordingly, the image decoding device can reduce the amount of processing.

When reference is restricted, time until a processed field is not referred to any longer by another field is shorter than the case where no reference is restricted. For this reason, it is possible to discard the processed field from the frame memory 108 at an earlier time. Accordingly, it is possible to reduce the size of the frame memory 108. The image decoding device can find the frame memory size that should be secured according to the reference constraint flag at the earlier time. Accordingly, the image decoding device can secure the system resource at the earlier time.

Figure 8:
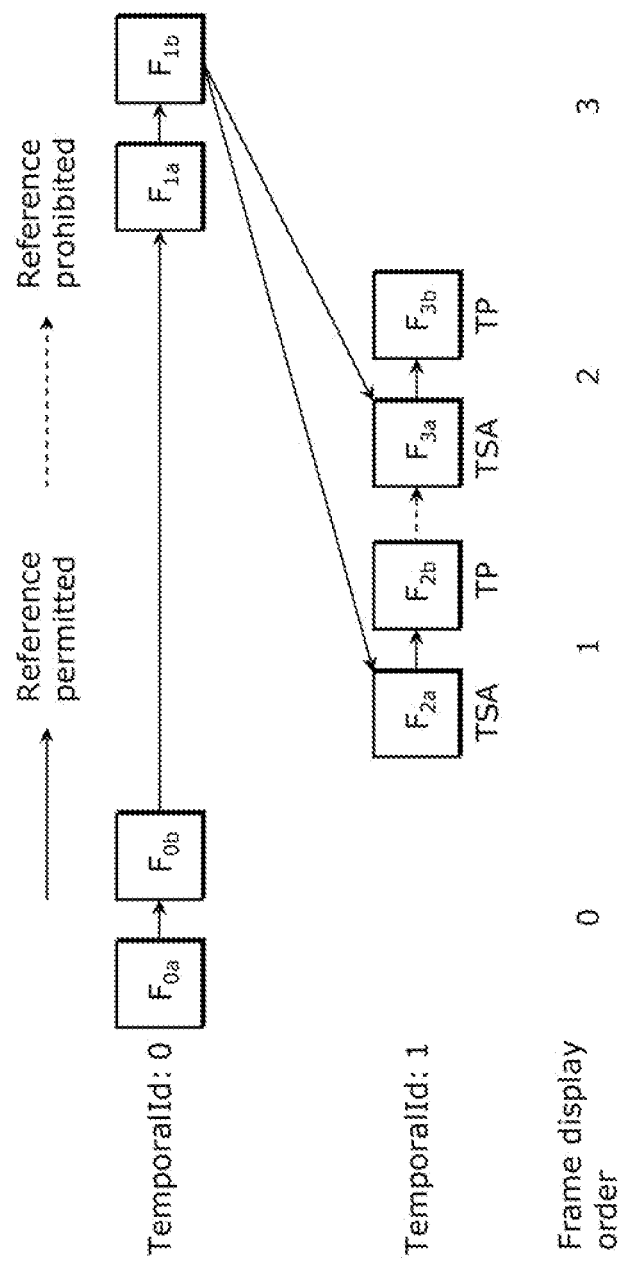
FIG. 8 is a diagram illustrating a modification of constraint in reference between pictures (fields) according to Embodiment 1.

The hierarchical structure illustrated in FIG. 7 is an example, and thus hierarchical structures are not limited to the example in FIG. 7. For example, a two-layer hierarchical structure as in FIG. 8 is also possible. Such a modification is possible using TemporalId that is input from outside.

In this embodiment, the reference constraint flag is input from outside. However, the reference constraint flag may not input from outside. For example, reference may be always restricted, reference may be restricted when an image is encoded on a per field basis, or the value of a reference constraint flag may be determined according to a coding condition. Alternatively, any reference constraint flag may not be encoded.

For example, reference constant in encoding and decoding may be always determined in advance. The image decoding device may derive a picture type from a field number, a field classification, a picture structure, or TemporalId.

Furthermore, the image encoding device 100 may use sps_temporal_id_nesting_flag conforming to the current HEVC standard (Non Patent Literature 1). As in this embodiment, when reference is restricted, the image encoding device 100 may set sps_temporal_id_nesting_flag to 1, and may encode the sps_temporal_id_nesting_flag.

In this embodiment, TemporalId is input from outside. However, TemporalId may not be input from outside. For example, the image encoding device 100 may include a TemporalId setting unit. The TemporalId setting unit may set TemporalId for each of input pictures according to a predetermined method. The predetermined method may be, for example, a method for incrementing TemporalId by 1 for each picture, and returning the incremented TemporalId to 0 at three-picture intervals.

In addition, any picture structure, field number, and field classification may not be input from outside. They may be fixed values, or be determined according to a predetermined method.

In this embodiment, each picture type is determined by deciding whether the field that immediately precedes the current field in coding order is one of the first fields in the same frame, based on the field number of the preceding field. Picture type determination methods are not limited to the method.

For example, when a current field is a second field, the field that immediately precedes the current field in coding order may be always determined to be one of the first fields in the same frame in advance. The second field may be determined to be a trailing picture irrespective of the immediately previous field. In this case, the field number may not be input to the picture type determining unit 101 as a matter of course.

A top field is set as a first field, and a bottom field is set as a second field. Inversely, a bottom field is set as a first field, and a top field is set as a second field. Furthermore, these settings may be switched in a point other than the starting point in a process.

The whole or part of picture information including a reference constraint flag, a picture structure, a field number, TemporalId, a field classification, etc. may be encoded at the beginning of a sequence including a plurality of pictures, at the beginning of a picture or a field, or at the beginning of a slice. The whole or part of the picture information may be encoded as a part of supplemental enhancement information (SEI) according to the current HEVC standard (Non Patent Literature 1).

When a premise that reference is restricted is predetermined, a determination (S202 in FIG. 6) based on a reference constraint flag may not be made. When a premise that a picture structure is a field structure is predetermined, a determination based on the picture structure may not be made (S203 in FIG. 6). When a premise that a second field in the same frame including a first field is encoded immediately after the first field, a determination (S205 in FIG. 6) based on the immediately previous current field to be encoded may not be made.

Furthermore, a process in this embodiment may be executed using software. The software may be distributed by download etc. The software may be recorded on a recording medium such as a CD-ROM, and be distributed. This applies to the other embodiments in the present Description as a matter of course.

Embodiment 2

In this embodiment, main characteristics of the image encoding device described in Embodiment 1 are indicated.

Figure 9:
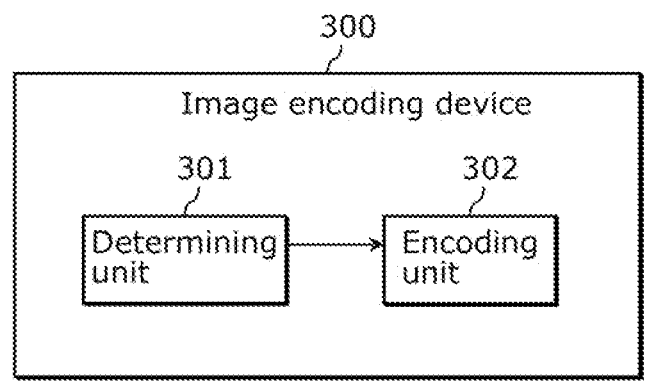
FIG. 9 is a block diagram of an image encoding device according to Embodiment 2.

FIG. 9 is a block diagram of an image encoding device according to this embodiment. An image encoding device 300 illustrated in FIG. 9 includes a determining unit 301 and an encoding unit 302. The determining unit 301 corresponds to the picture type determining unit 101 in FIG. 4. The encoding unit 302 corresponds to the dividing unit 102, the subtractor 103, the transform and quantization unit 104, the encoding unit 105, the inverse quantization unit 106, the adder 107, the frame memory 108, the intra prediction unit 109, and the inter prediction unit 110 in FIG. 4.

Figure 10:
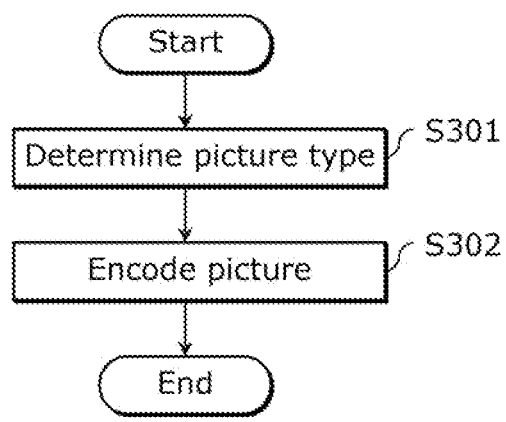
FIG. 10 is a flowchart of an image encoding device according to Embodiment 2.

FIG. 10 is a flowchart of operations performed by the image encoding device 300 illustrated in FIG. 9. It is to be noted as a premise that the image encoding device 300 encodes, on a per field basis, a plurality of pictures classified into a plurality of layers for which reference from a picture belonging to a higher layer to a picture belonging to a lower layer is prohibited. The image encoding device 300 restricts reference as a premise. More specifically, the image encoding device 300 encodes at least one of the plurality of pictures as a TSA picture for which predetermined reference is prohibited.

First, the determining unit 301 determines whether a current picture included in the plurality of pictures is a TSA picture or a trailing picture for which the predetermined reference is permitted. Stated differently, the determining unit 301 determines the picture type of the current picture (S301).

When the current picture here does not belong to the highest layer and corresponds to a first field, the determining unit 301 determines that the current picture is a TSA picture. When the current picture belongs to the highest layer, or corresponds to a second field, the determining unit 301 determines that the current picture is a trailing picture.

Here, the first field is a field that is encoded earlier than a second field in a pair of fields in a frame. The second field is a field that is encoded later than the first field in the pair of fields in the frame.

Next, the encoding unit 302 encodes the plurality of pictures according to whether the current picture is the TSA picture or the trailing picture (S302).

For example, when the current picture is determined to be the TSA picture, the encoding unit 302 encodes an unencoded picture with predetermined reference being prohibited. When the current picture is determined to be the trailing picture, the encoding unit 302 encodes an unencoded picture with the predetermined reference being permitted.

Here, the unencoded picture is any of pictures composed of the current picture and the following pictures in coding order among the plurality of pictures. The predetermined reference is reference from the unencoded picture to an encoded picture that is the picture preceding the current picture in coding order among the plurality of pictures and belonging to a layer to which the current picture belongs or a layer below the layer to which the current picture belongs.

The first field may be a top field, and the second field may be a bottom field. Accordingly, settings that a first field is a top field and a second field is a bottom field may be determined in advance. As illustrated in FIG. 2, the top field is a field spatially located above a bottom field, and the bottom field is a field spatially located below the top field.

When the current picture belongs to the highest layer or corresponds to the second field, and when the picture immediately preceding the current picture in decoding order corresponds to the first field in a frame including the current picture, the determining unit 301 may determine the current picture to be a trailing picture. The determining unit 301 may determine the current picture to be a TSA picture in the other cases.

In short, the second field may be the field immediately following the first field in coding order. The first field may be the field immediately preceding the second field in coding order. In addition, a pair of fields in a frame may be predetermined to be encoded sequentially.

The encoding unit 302 may encode a picture type indicating whether a current picture is a TSA picture or a trailing picture.

Embodiment 3

Overall Configuration

Figure 11:
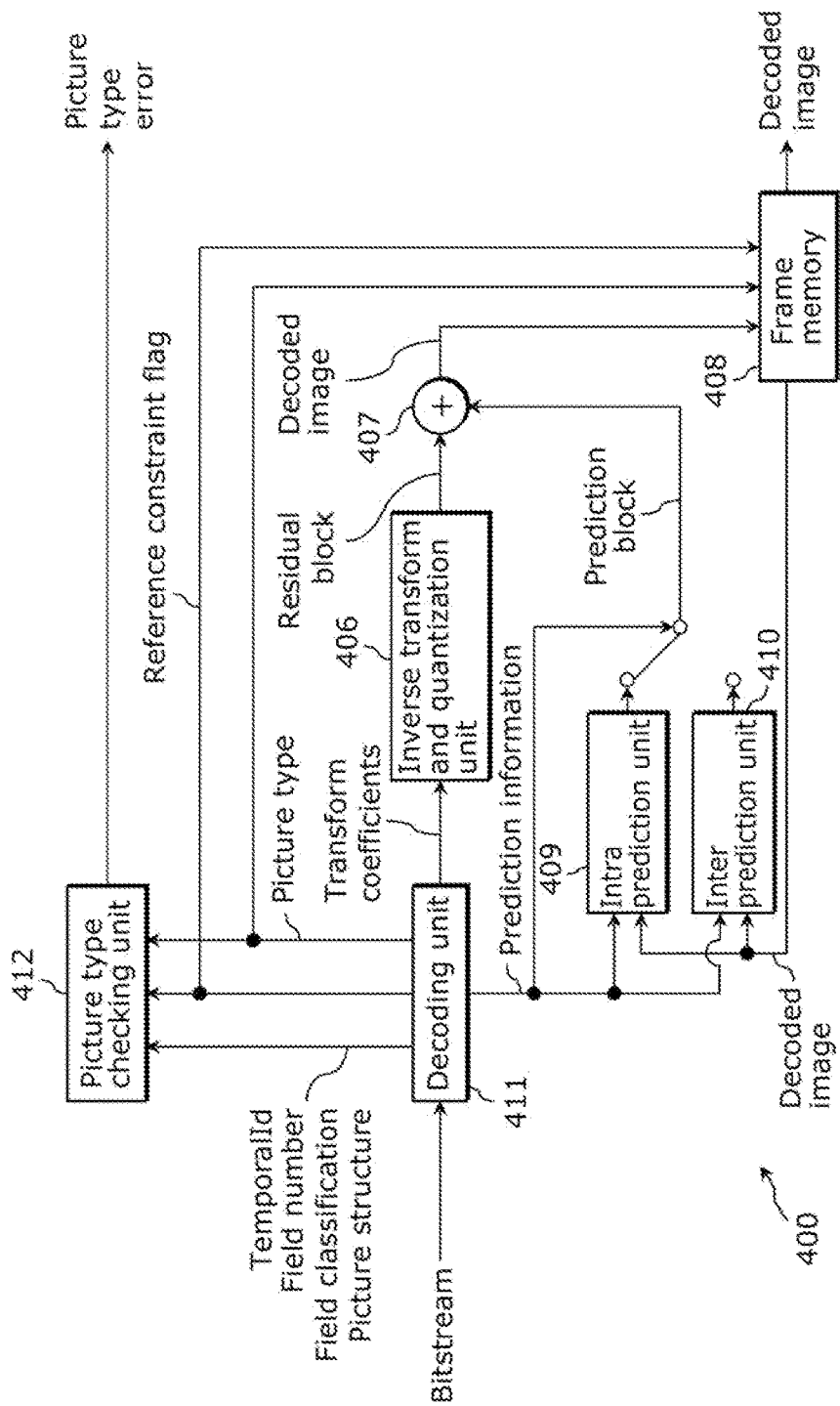
FIG. 11 is a block diagram of an image decoding device according to Embodiment 3.

FIG. 11 illustrates a configuration of an image decoding device according to this embodiment. The image decoding device 400 illustrated in FIG. 11 includes: a picture type checking unit 412; a decoding unit 411; an inverse transform and quantization unit 406; an adder 407; a frame memory 408; an intra prediction unit 409; and an inter prediction unit 410. For example, these constituent elements are exclusive or general-purpose circuitry.

Operations (Whole)

Figure 12:
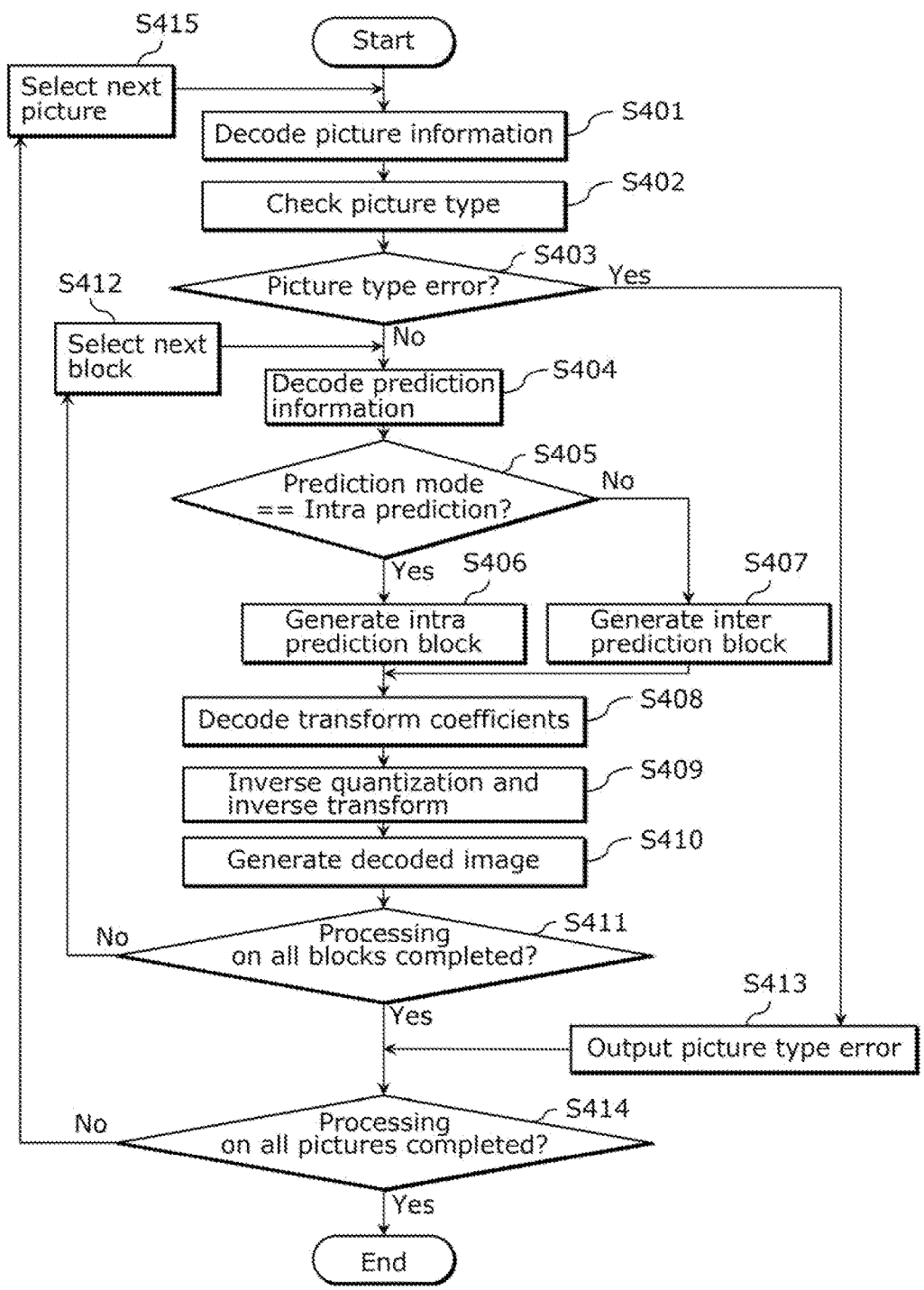
FIG. 12 is a flowchart of an image decoding device according to Embodiment 3.

Next, an overall decoding flow is described with reference to FIG. 12.

First, the decoding unit 411 decodes picture information included in a bitstream (S401). More specifically, the decoding unit 411 decodes a reference constraint flag, a picture type, TemporalId, a field number, a field classification, and a picture structure.

Next, the picture type checking unit 412 checks the picture type of a current picture (S402). Stated differently, the picture type checking unit 412 determines whether or not the decoded picture type is correct. This is described in detail later.

When the picture type is incorrect, stated differently, when the picture type is erroneous (Yes in S403), the picture type checking unit 412 outputs information indicating that the picture type is erroneous (S412). For example, in this case, the image decoding device 400 displays indication of the error for the display device and ends the decoding process of the current picture.

Next, the decoding unit 411 decodes prediction information (S404). When a prediction mode included in the prediction information is intra prediction (Yes in S405), the intra prediction unit 409 generates a prediction block based on intra prediction (S406). When a prediction mode is inter prediction (No in S405), the inter prediction unit 410 generates a prediction block based on inter prediction (S407).

Next, the decoding unit 411 decodes transform coefficients (S408). Next, the inverse transform and quantization unit 406 performs inverse quantization and inverse transform on the decoded transform coefficients to reconstruct the residual block (S409). Next, the adder 407 adds (sums) the residual block and the prediction block to generate a decoded block (decoded image) (S410).

Next, when processing on all of the blocks has not yet been completed (No in S411), the image decoding device 400 selects a next block (S412). The image encoding device 400 repeats the above described processes (S404 to S410) until processing on all of the blocks in a picture has been completed. In addition, when processing on all of the pictures has not yet been completed (No in S414), the image decoding device 400 selects a next picture (S415). Next, the image decoding device 400 repeats the above described processes (S401 to S413) until processing on all of the pictures has been completed.

The image decoding device 400 may discard, from the frame memory 408, a picture that is not referred to any longer from another picture because of reference constraint based on a reference constraint flag, appearance of a TSA picture, etc. The image decoding device 400 does not need to decode the picture that is not referred to by any picture when decoding a stream starting from a point other than the starting point in a stream.

Operations (Picture Type Check)

Figure 13:
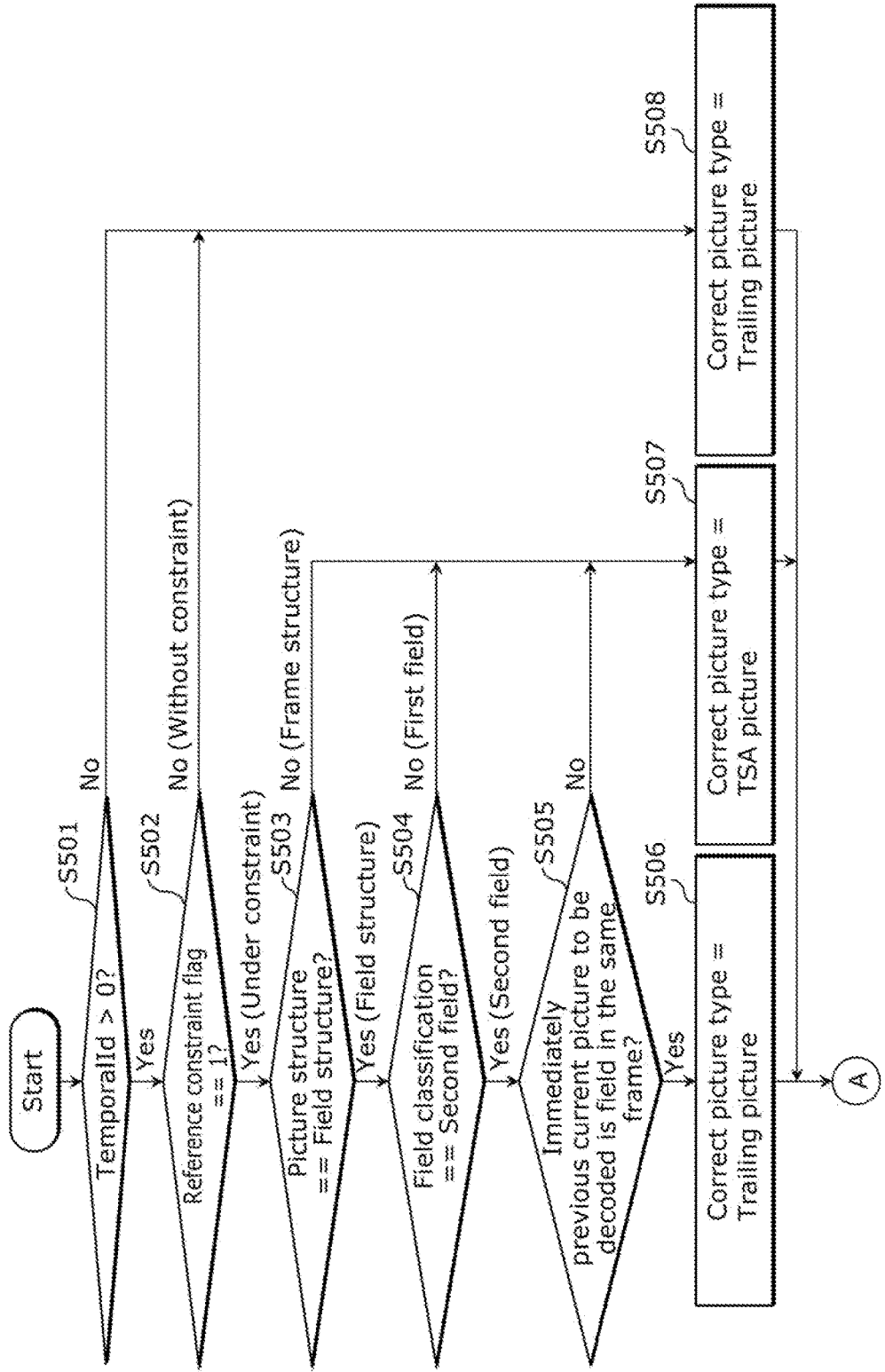
FIG. 13 is a flowchart of operations performed by a picture type checking unit according to Embodiment 3.
Figure 14:
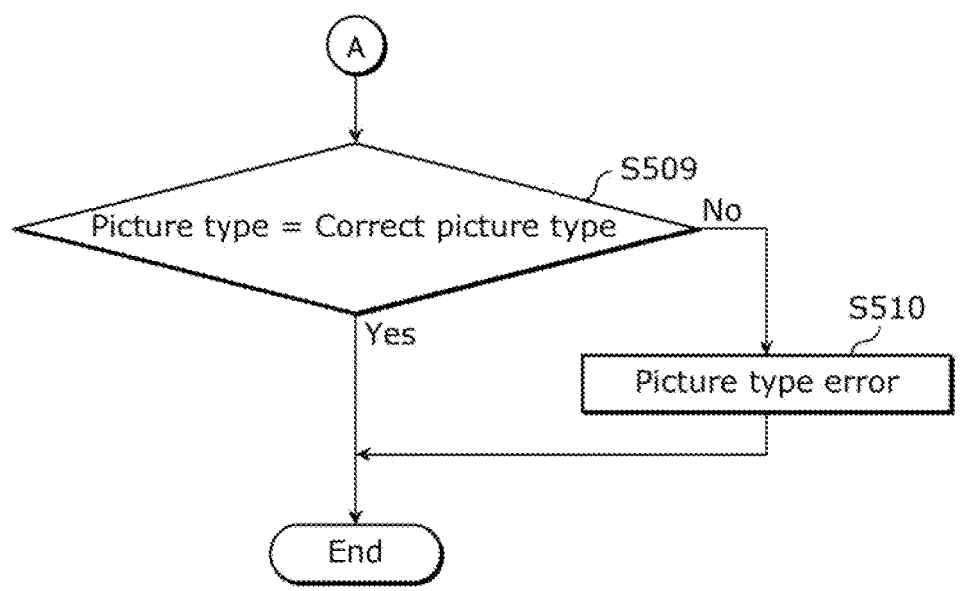
FIG. 14 is a flowchart of operations performed by a picture type checking unit according to Embodiment 3.

Next, a picture type check flow is described with reference to FIGS. 13 and 14.

First, when the TemporalId is 0 (No in S501) or the reference constraint flag is 0 (No in S502), the picture type checking unit 412 sets a correct picture type to a trailing picture (S508).

Next, when the picture structure is a frame structure (No in S503), the picture type checking unit 412 sets a correct picture type to a TSA picture (S507).

Next, when the field classification indicates a first field (No in S504), the picture type checking unit 412 sets a correct picture type to a TSA picture (S507).

Next, when the immediately previous field in decoding order is a first field in the same frame (Yes in S505), the picture type checking unit 412 sets a correct picture type to a trailing picture (S506). Otherwise, the picture type checking unit 412 sets a correct picture type to a TSA picture (S507). Whether or not the immediately previous field in decoding order is the first field is determined based on a field number indicating the display order of the field.

Next, the picture type checking unit 412 checks whether or not the picture type decoded by the decoding unit 411 is identical to the correct picture type (S509). When the picture type decoded by the decoding unit 411 is different from the correct picture type (No in S509), the picture type checking unit 412 determines that the picture type is erroneous (S510).

Effects

As described above, the image decoding device 400 in this embodiment can decode a bitstream encoded by the image encoding device 100 in Embodiment 1. The image decoding device 400 in this embodiment uses picture types as in Embodiment 1, and thus can obtain effects similar to those obtained in Embodiment 1.

The image decoding device 400 can determine whether or not a picture type in a bitstream is correct by checking the picture type. Accordingly, the image decoding device 400 can detect a corrupt bitstream. The image decoding device 400 can prevent occurrence of a state in which a decoding process on a corrupt bitstream fails, and thus can prevent a state in which the decoding process cannot be ended correctly.

The image decoding device 400 can find that reference is restricted according to the reference constraint flag prior to decoding. For this reason, the image decoding device 400 can skip a process of decoding a field that is not referred to by any field. Accordingly, the image decoding device 400 can reduce the amount of processing.

When reference is restricted, time until a processed field is not referred to any longer by another field is shorter than the case where no reference is restricted. For this reason, the image decoding device 400 can discard a processed field from the frame memory 408 at an earlier time, and thus can decode an image using the frame memory 408 having a small size.

The image decoding device 400 can find the frame memory size that should be secured according to the reference constraint flag at the earlier time. Accordingly, the image decoding device 400 can secure the system resource at the earlier time.

In this embodiment, the reference constraint flag is included in a bitstream. However, the reference constraint flag may not be included in a bitstream. For example, reference may be always restricted, reference may be restricted when an image is decoded on a per field basis, or the value of a reference constraint flag may be determined according to a decoding condition.

In addition, sps_temporal_id_nesting_flag according to the current HEVC standard (Non Patent Literature 1) may be used as a reference constraint flag. For example, a determination that reference is restricted may be made when sps_temporal_id_nesting_flag is 1.

The whole or part of picture information including a reference constraint flag, a picture structure, a field number, TemporalId, a field classification, etc. may be decoded at the beginning of a sequence including a plurality of pictures, at the beginning of a picture or a field, or at the beginning of a slice. The whole or part of the picture information may be decoded as a part of supplemental enhancement information (SEI) according to the current HEVC standard (Non Patent Literature 1).

When decoding picture information at the beginning of a sequence, the image decoding device 400 may decode all of the plurality of pictures after checking that all of the picture types of the plurality of pictures are correct. When the picture types of the plurality of pictures are partly incorrect, the image decoding device 400 may skip decoding of a picture having an incorrect picture type, or may stop the whole decoding of the plurality of pictures.

Embodiment 4

In this embodiment, main characteristics of the image decoding device described in Embodiment 3 are indicated.

Figure 15:
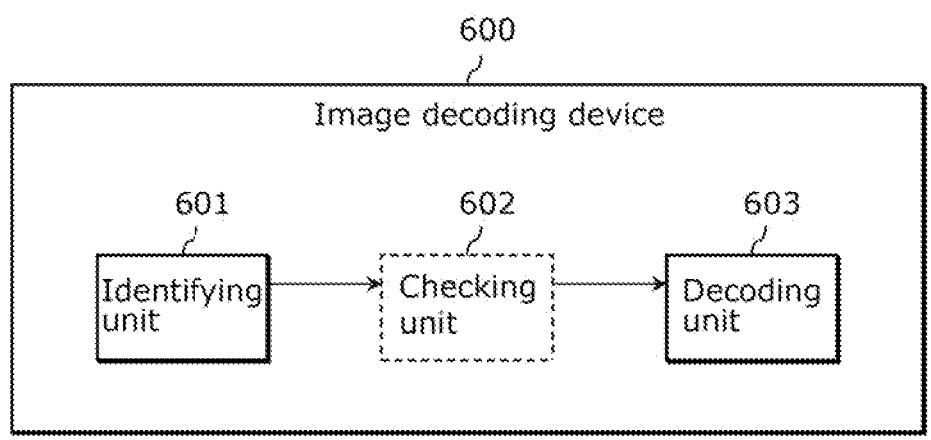
FIG. 15 is a block diagram of an image decoding device according to Embodiment 4.

FIG. 15 is a block diagram of an image decoding device according to this embodiment. The image decoding device 600 illustrated in FIG. 15 includes an identifying unit 601 and a decoding unit 603. The identifying unit 601 corresponds to part of the decoding unit 411 in FIG. 11. The decoding unit 603 includes constituent elements in FIG. 11 that are: the other part of the decoding unit 411; the inverse transform and quantization unit 406; the adder 407; the frame memory 408; the intra prediction unit 409; and the inter prediction unit 410.

The image decoding device 600 may include a checking unit 602, or may not include the checking unit 602. The checking unit 602 corresponds to the picture type checking unit 412 in FIG. 11.

Figure 16:
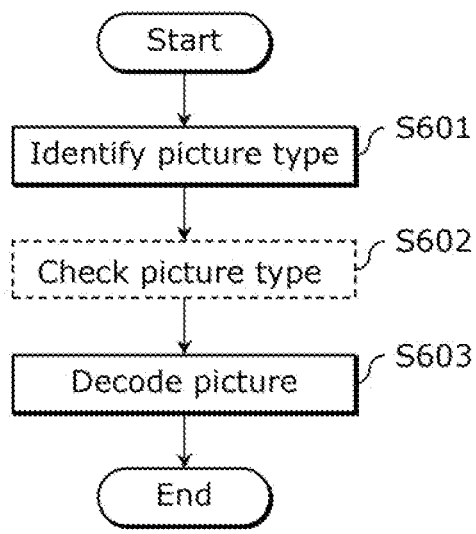
FIG. 16 is a flowchart of operations performed by an image decoding device according to Embodiment 4.

FIG. 16 is a flowchart of operations performed by the image decoding device 600 illustrated in FIG. 15. It is to be noted as a premise that the image decoding device 600 decodes, on a per field basis, a plurality of pictures classified into a plurality of layers for which reference from a picture belonging to a higher layer to a picture belonging to a lower layer is prohibited. The image encoding device 600 restricts reference as a premise. More specifically, the image decoding device 600 decodes at least one of the plurality of pictures as a TSA picture for which predetermined reference is prohibited.

First, the identifying (determining) unit 601 identifies (determines) whether a current picture included in the plurality of pictures is a TSA picture or a trailing picture for which the predetermined reference is permitted. Stated differently, the identifying unit 601 determines a picture type of the current picture (S601).

When the current picture here does not belong to the highest layer and corresponds to a first field, the identifying unit 601 identifies that the current picture as a TSA picture. When the current picture belongs to the highest layer, or corresponds to a second field, the identifying unit 601 identifies the current picture as a trailing picture.

Here, the first field is a field that is decoded earlier than a second field in a pair of fields in a frame. Here, the second field is a field that is decoded later than the first field in the pair of fields in the frame.

Next, the decoding unit 603 decodes a plurality of pictures according to whether a current picture is a TSA picture or a trailing picture (S603).

For example, when the current picture is identified as a TSA picture, the decoding unit 603 decodes an undecoded picture with predetermined reference being prohibited. When the current picture is identified as a trailing picture, the decoding unit 603 decodes an undecoded picture with predetermined reference being permitted.

Here, the undecoded picture is any of pictures composed of the current picture or the following pictures in decoding order among the plurality of pictures. The predetermined reference is reference from the undecoded picture to a decoded picture that is the picture preceding the current picture in decoding order among the plurality of pictures and belonging to a layer to which the current picture belongs or a layer below the layer to which the current picture belongs.

The first field may be a top field. The second field may be a bottom field. Accordingly, settings that a first field is a top field and a second field is a bottom field may be determined in advance. As illustrated in FIG. 2, the top field is a field spatially located above a bottom field, and the bottom field is a field spatially located below the top field.

When the current picture belongs to the highest layer or corresponds to a second field, and when the picture immediately preceding the current picture in decoding order corresponds to a first field in a frame including the current picture, the identifying unit 601 may identify the current picture as a trailing picture. The identifying unit 601 may identify the current picture as a TSA picture in the other cases.

In short, the second field may be the field immediately following the first field in decoding order. The first field may be the field immediately preceding the second field in decoding order. In addition, a pair of fields in a frame may be predetermined to be decoded sequentially.

The decoding unit 603 may decode a picture type indicating whether a current picture is a TSA picture or a trailing picture.

For example, when the current picture here does not belong to the highest layer and corresponds to a first field, the identifying unit 601 identifies that the current picture as a TSA picture according to the picture type decoded by the decoding unit 603. For example, when the current picture belongs to the highest layer or corresponds to a second field, the identifying unit 601 identifies the current picture as a trailing picture according to the picture type decoded by the decoding unit 603.

As described above, the image decoding device 600 may include the checking unit 602 which checks that the picture type decoded by the decoding unit 603 is correct. The checking unit 602 checks that the decoded picture type of the current picture is correct prior to decoding the current picture (S602).

For example when the current picture does not belong to the highest layer and corresponds to the first field, the checking unit 602 checks that the picture type decoded by the decoding unit 603 indicates that the current picture is the TSA picture. For example, when the current picture belongs to the highest layer and corresponds to the second field, the checking unit 602 checks that the picture type decoded by the decoding unit 603 indicates that the current picture is the trailing picture.

In this way, the checking unit 602 checks that the picture type decoded by the decoding unit 603 is correct. When the picture type decoded by the decoding unit 603 is incorrect, the checking unit 602 may control decoding of the plurality of pictures so that the current picture is not decoded. For example, the checking unit 602 may allow the decoding unit 603 to skip decoding of a current picture by notifying the decoding unit 603 of the fact that the picture type decoded by the decoding unit 603 is incorrect.

In each of the above embodiments, each of the constituent elements is implemented by circuitry including, for example, an MPU, memory, etc. The processes executed by the respective constituent elements may be executed by software (a program). The software is, for example, recorded on a recording media such as a ROM. The software may be distributed by downloading or the like, or may be recorded on recording media such as CD-ROMs and then be distributed. It is to be noted that the constituent elements may be implemented as hardware (exclusive circuitry) as a matter of course.

In other words, in each of the above embodiments, each of the constituent elements may be configured as exclusive hardware, or may be realized by executing a software program suitable for the constituent element. Each of the constituent elements may be realized by means of the program executing unit such as a CPU or a processor reading the software program recorded on a recording medium such as a hard disk or a semiconductor memory and executing the software program.

In other words, each of the image encoding device and the image decoding device includes processing circuitry and storage electrically connected to the processing circuitry (this storage is accessible from the processing circuitry). The processing circuitry includes at least one of the exclusive hardware and the program executing unit, and executes processing using the storage. In addition, when the processing circuitry includes the program executing unit, the storage stores the software program which is executed by the program executing unit.

Here, the software which implements the image encoding device in each of the embodiments is, for example, a program below.

The program causes a computer to execute image encoding method for encoding, on a per field basis, a plurality of pictures classified into a plurality of layers for which reference from a picture belonging to a higher layer to a picture belonging to a lower layer is prohibited, the plurality of pictures including at least one picture that is encoded as a temporal sub-layer access (TSA) picture for which predetermined reference is prohibited, the image encoding method including: determining whether a current picture included in the plurality of pictures is the TSA picture or a trailing picture for which the predetermined reference is permitted; and encoding the plurality of pictures according to whether the current picture is the TSA picture or the trailing picture, wherein the determining includes: determining the current picture to be the TSA picture when the current picture does not belong to a highest layer in the plurality of layers and corresponds to a first field that is encoded earlier than a second field in a pair of fields in a frame; and determining the current picture to be the trailing picture when the current picture belongs to the highest layer or corresponds to the second field that is encoded later than the first field in the pair of fields.

The program may cause a computer to execute an image decoding method for decoding, on a per field basis, a plurality of pictures classified into a plurality of layers for which reference from a picture belonging to a higher layer to a picture belonging to a lower layer is prohibited, the plurality of pictures including at least one picture that is decoded as a temporal sub-layer access (TSA) picture for which predetermined reference is prohibited, the image decoding method including: identifying whether a current picture included in the plurality of pictures is the TSA picture or a trailing picture for which the predetermined reference is permitted; and decoding the plurality of pictures according to whether the current picture is the TSA picture or the trailing picture, wherein the identifying includes: identifying the current picture as the TSA picture when the current picture does not belong to a highest layer in the plurality of layers and corresponds to a first field that is decoded earlier than a second field in a pair of fields in a frame; and identifying the current picture as the trailing picture when the current picture belongs to the highest layer or corresponds to the second field that is decoded later than the first field in the pair of fields.

The constituent elements may be circuits. All of these circuits may be integrated into a single circuit, or may be configured as separate circuits. Alternatively, each of the constituent elements may be implemented as a general processor or as an exclusive processor.

Alternatively, a process executed by a particular one of the processing units may be executed by another one of the processing units. Alternatively, the execution order of the processes may be changed, or some of the processes may be executed in parallel. Alternatively, an image encoding and decoding device may include the image encoding device and the image decoding device.

In addition, the processes described in each of the embodiments may be executed in centralized processing using a single device (system), or may be realized in distributed processing using a plurality of devices. The program may be executed by one or more computers. In other words, one computer may execute the program in centralized processing, or some computers may execute the program in distributed processing.

The herein disclosed subject matter is to be considered descriptive and illustrative only, and the appended Claims are of a scope intended to cover and encompass not only the particular embodiments disclosed, but also equivalent structures, methods, and/or uses.

Embodiment 5

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 17:
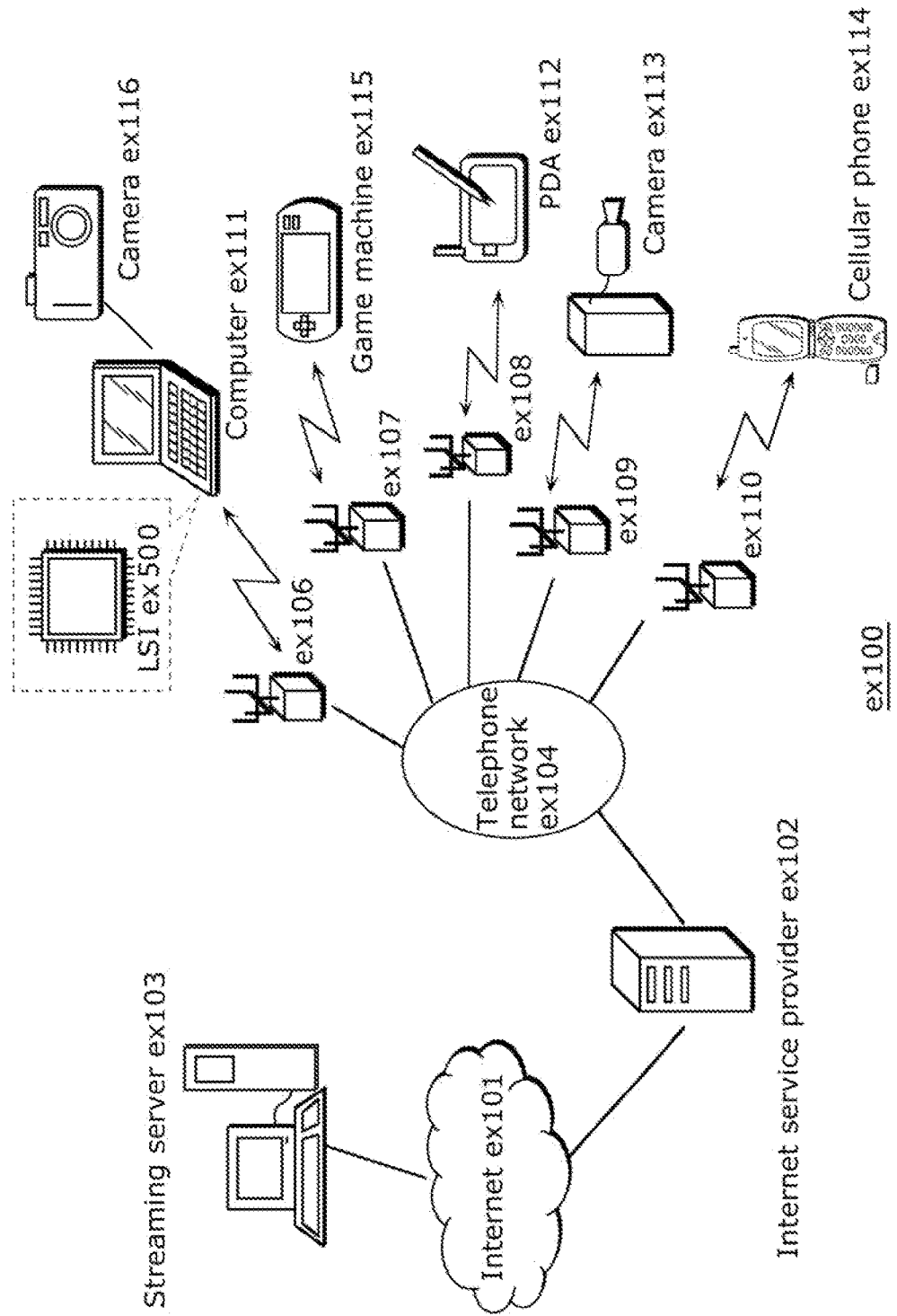
FIG. 17 shows an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
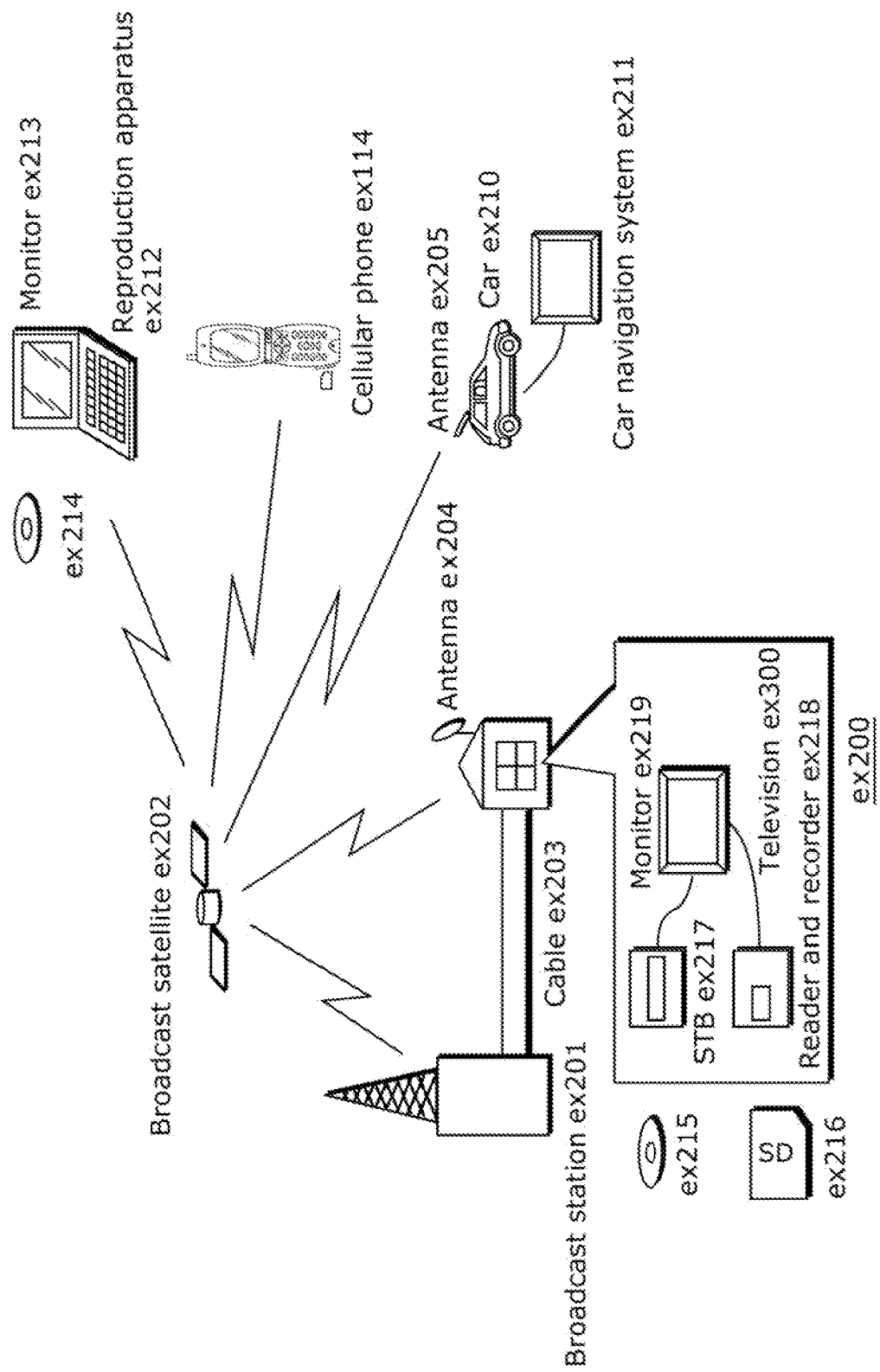
FIG. 18 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
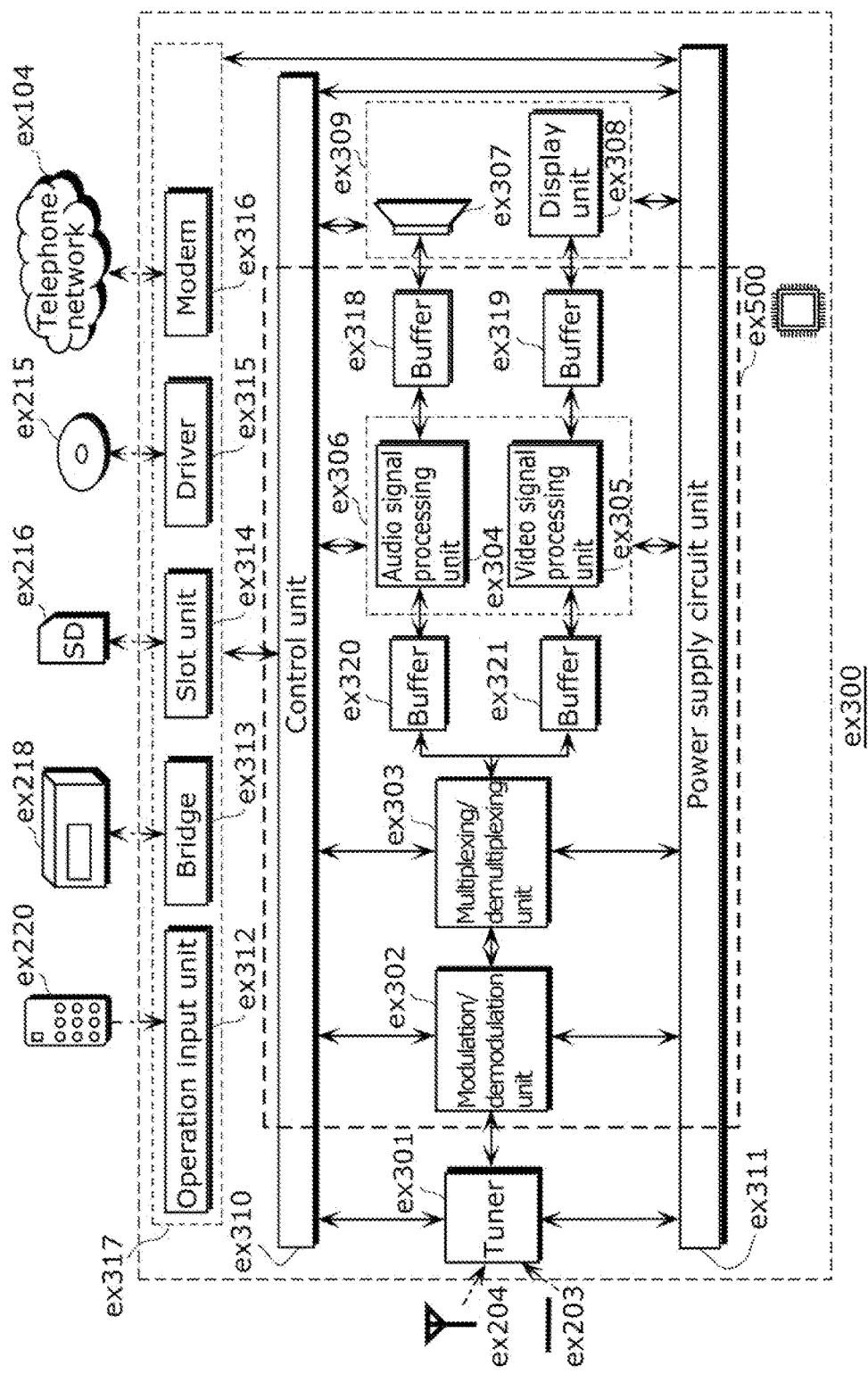
FIG. 19 shows a block diagram illustrating an example of a configuration of a television.

FIG. 19 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 20:
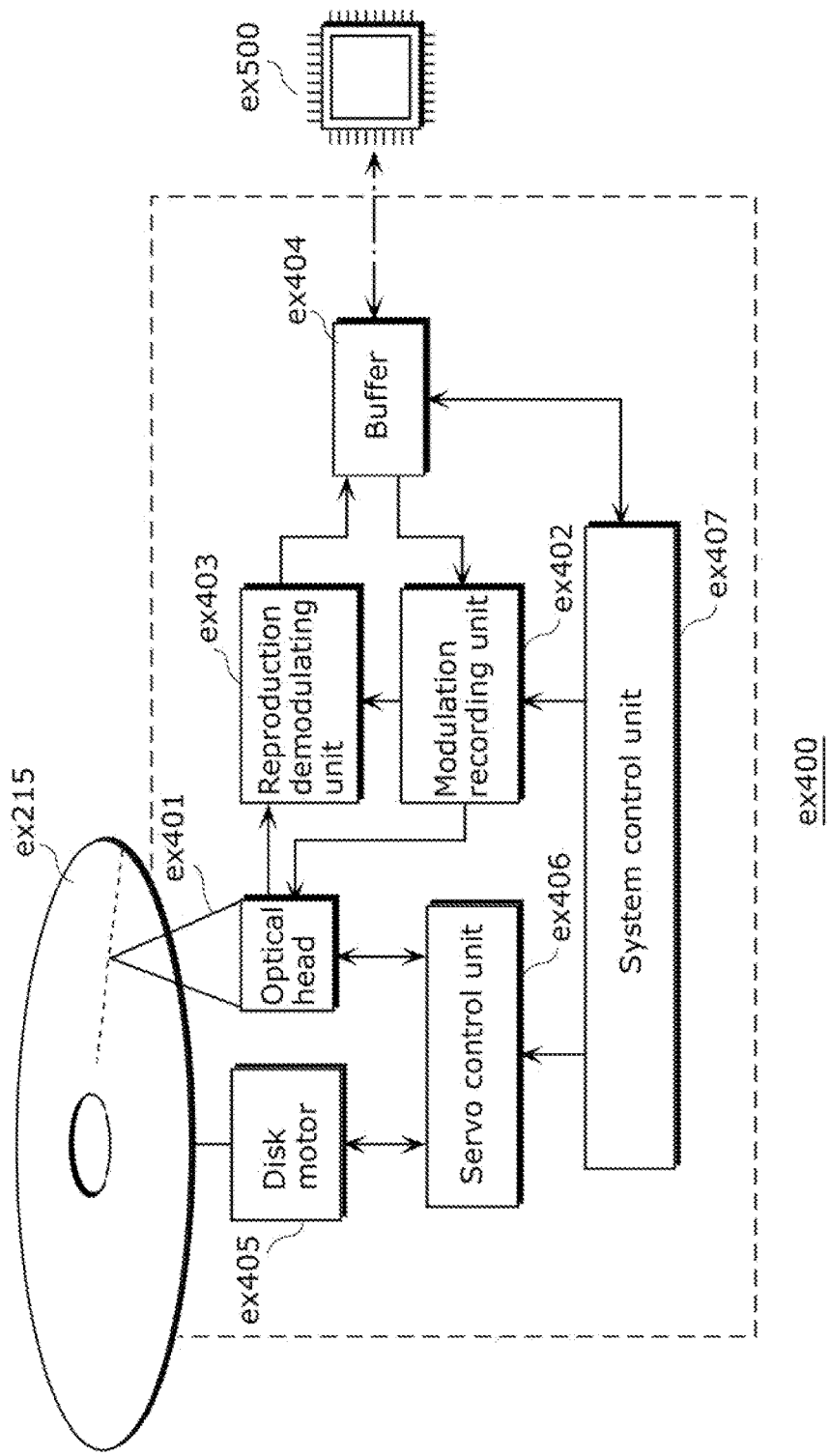
FIG. 20 shows a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
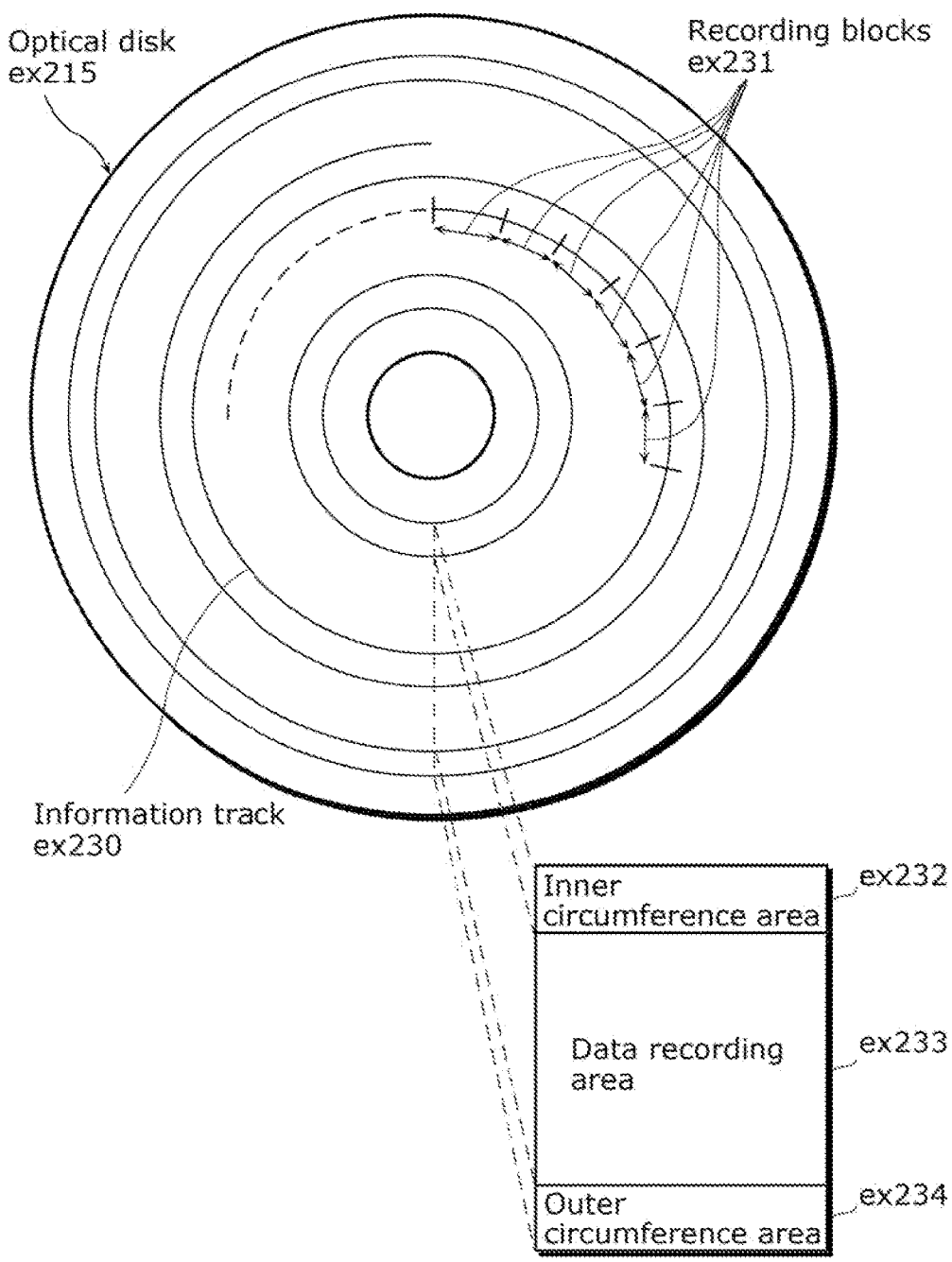
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
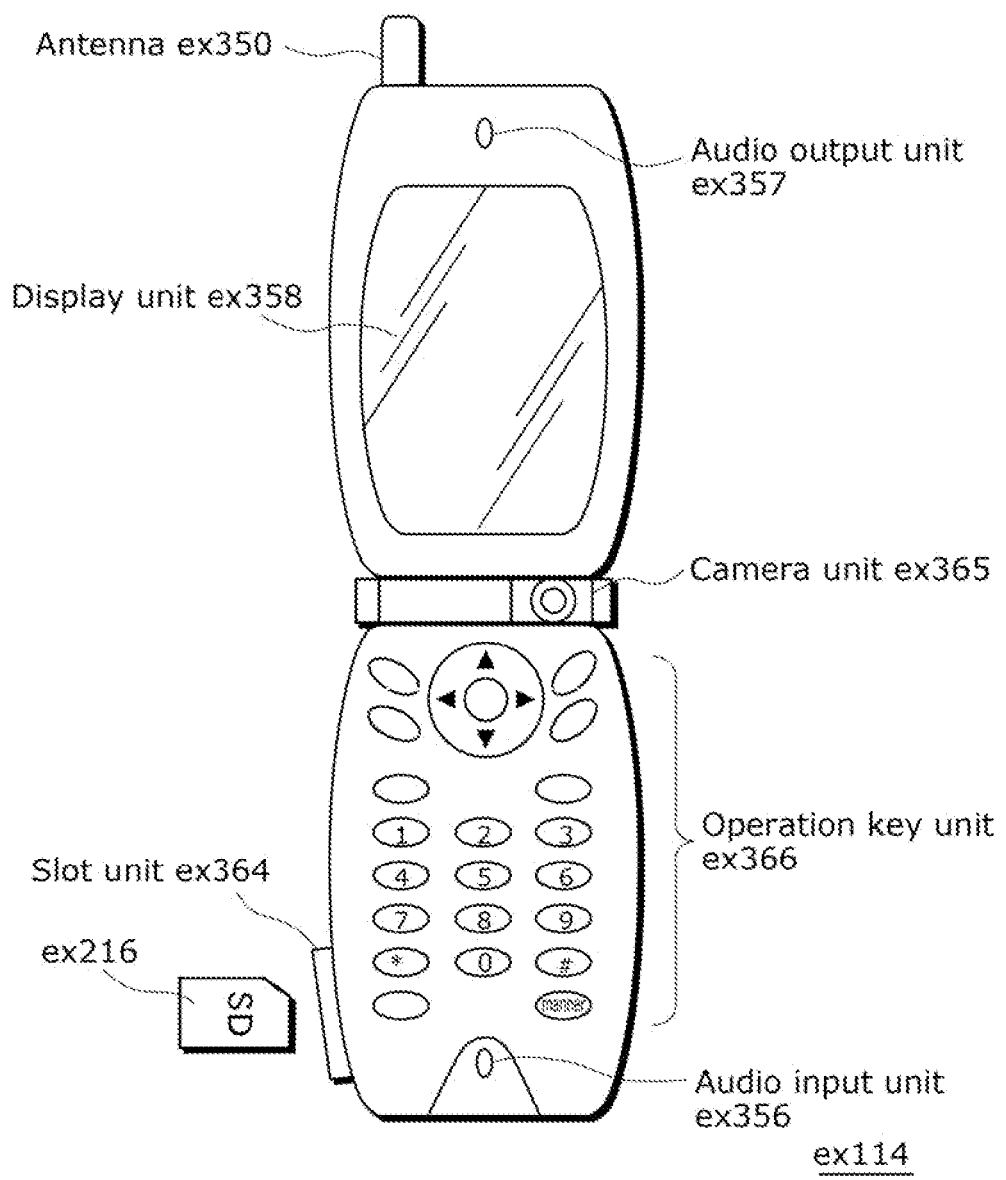
FIG. 22A shows an example of a cellular phone.

FIG. 22A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 22B:
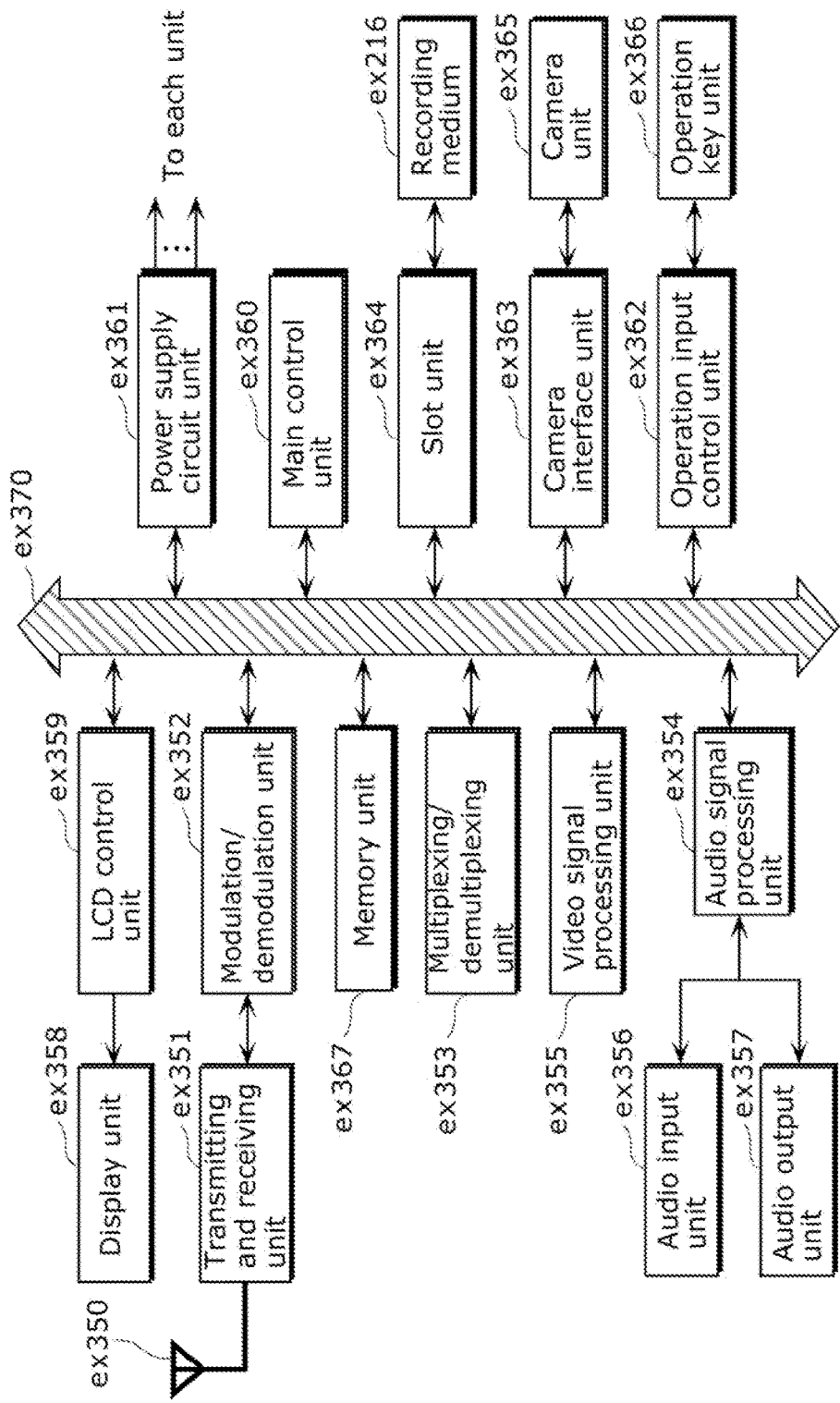
FIG. 22B is a block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Embodiment 6

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
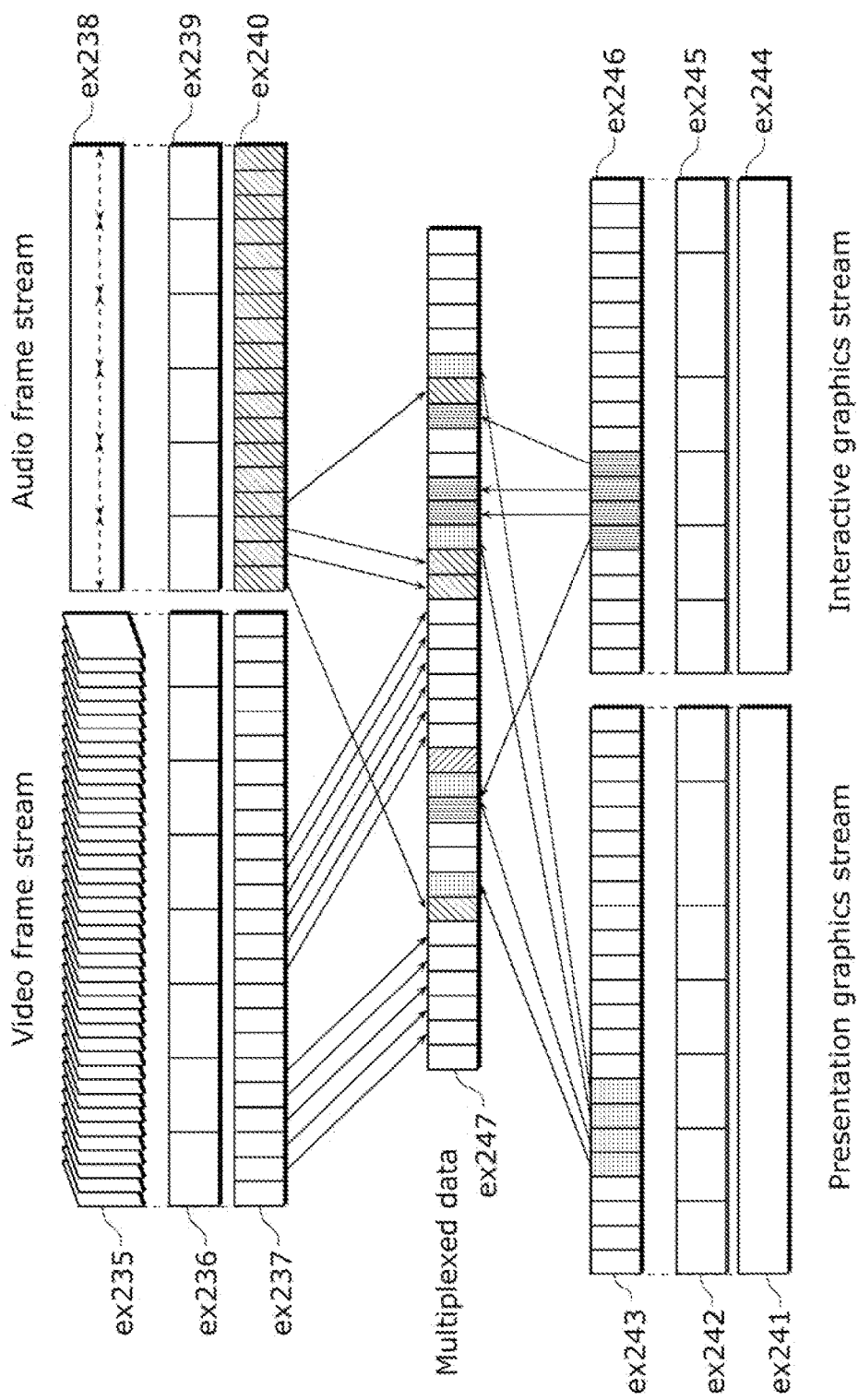
FIG. 24 schematically shows how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
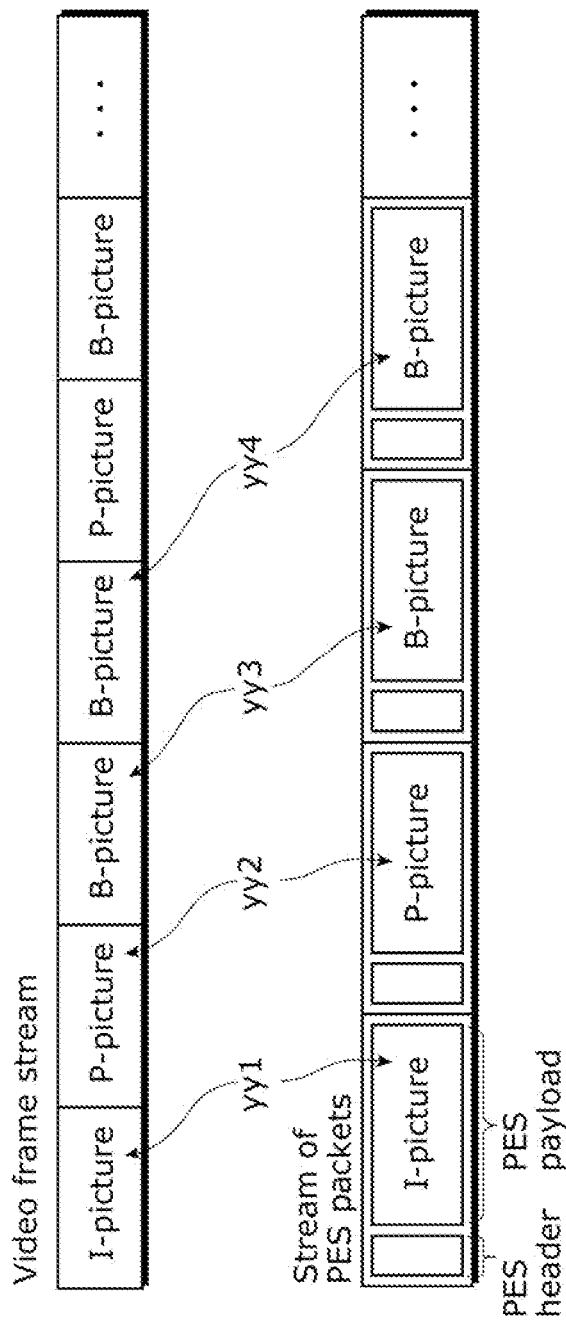
FIG. 25 shows how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
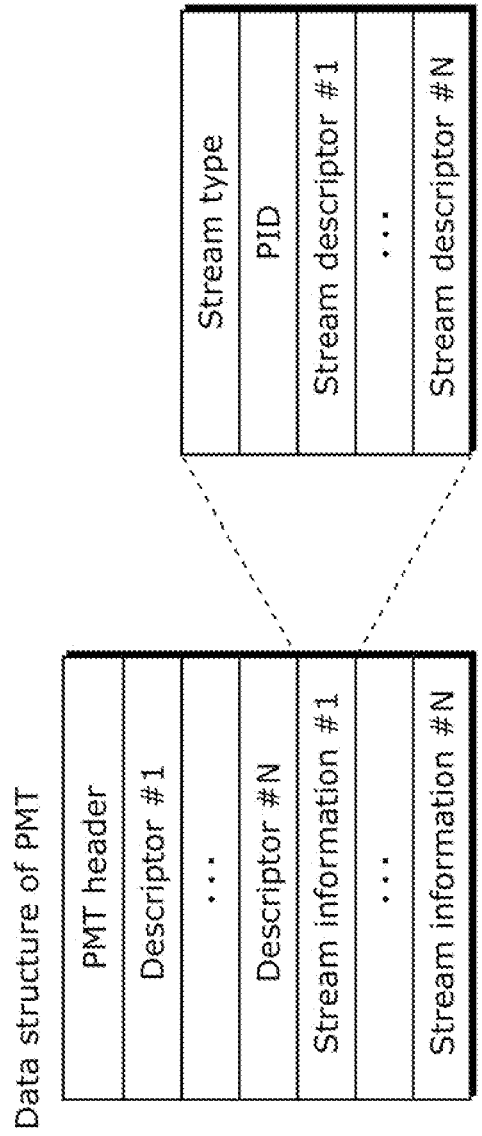
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
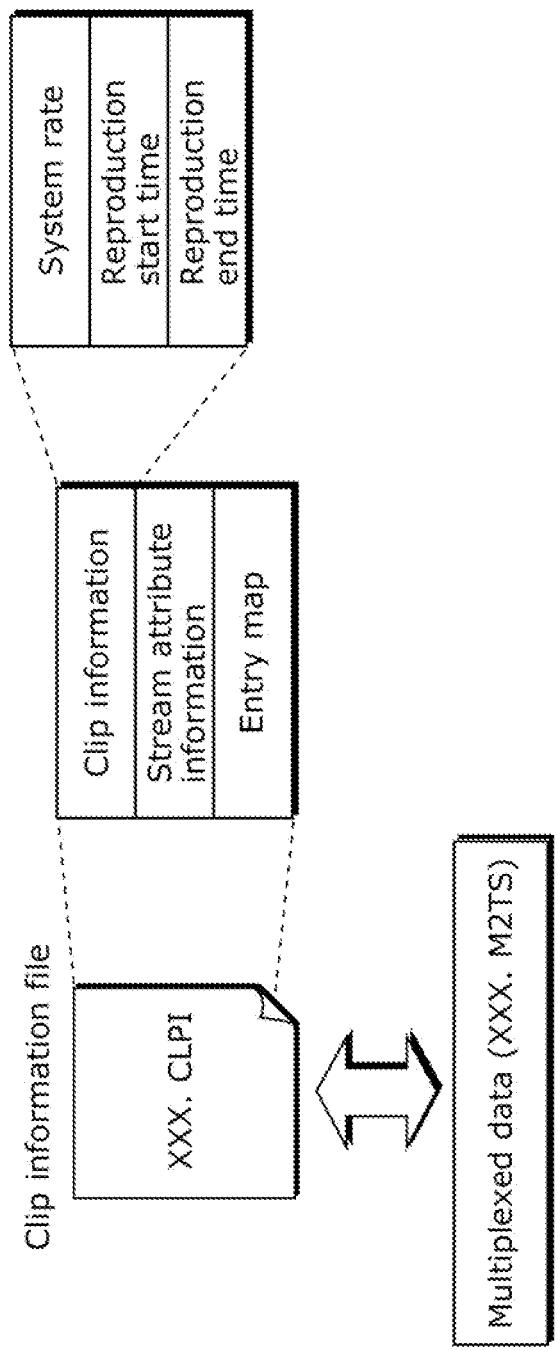
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
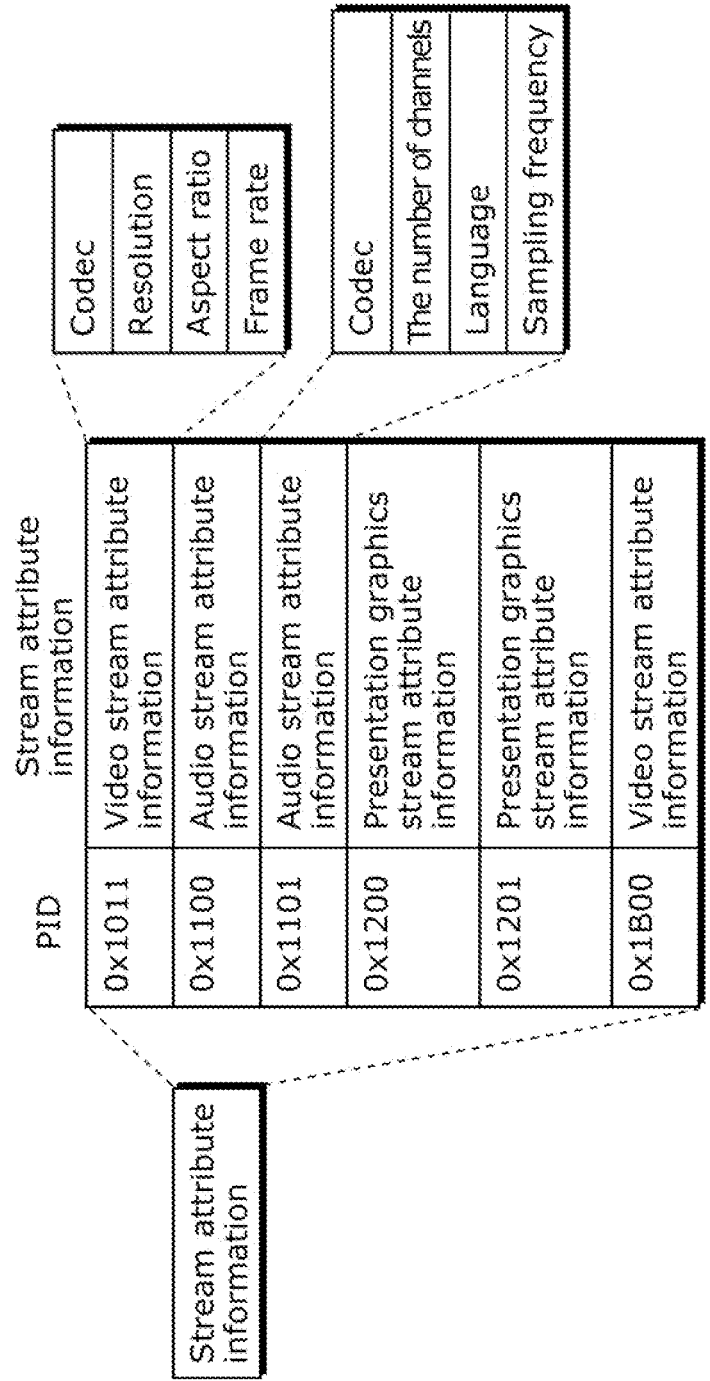
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 30:
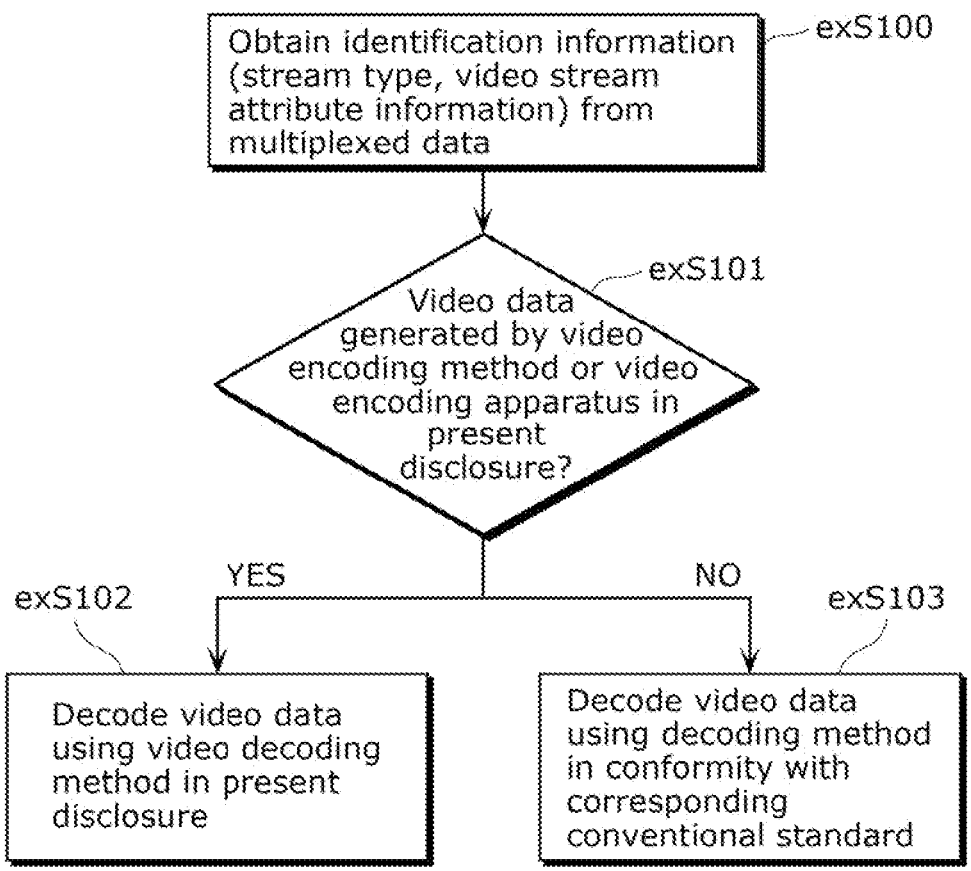
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 7

Figure 31:
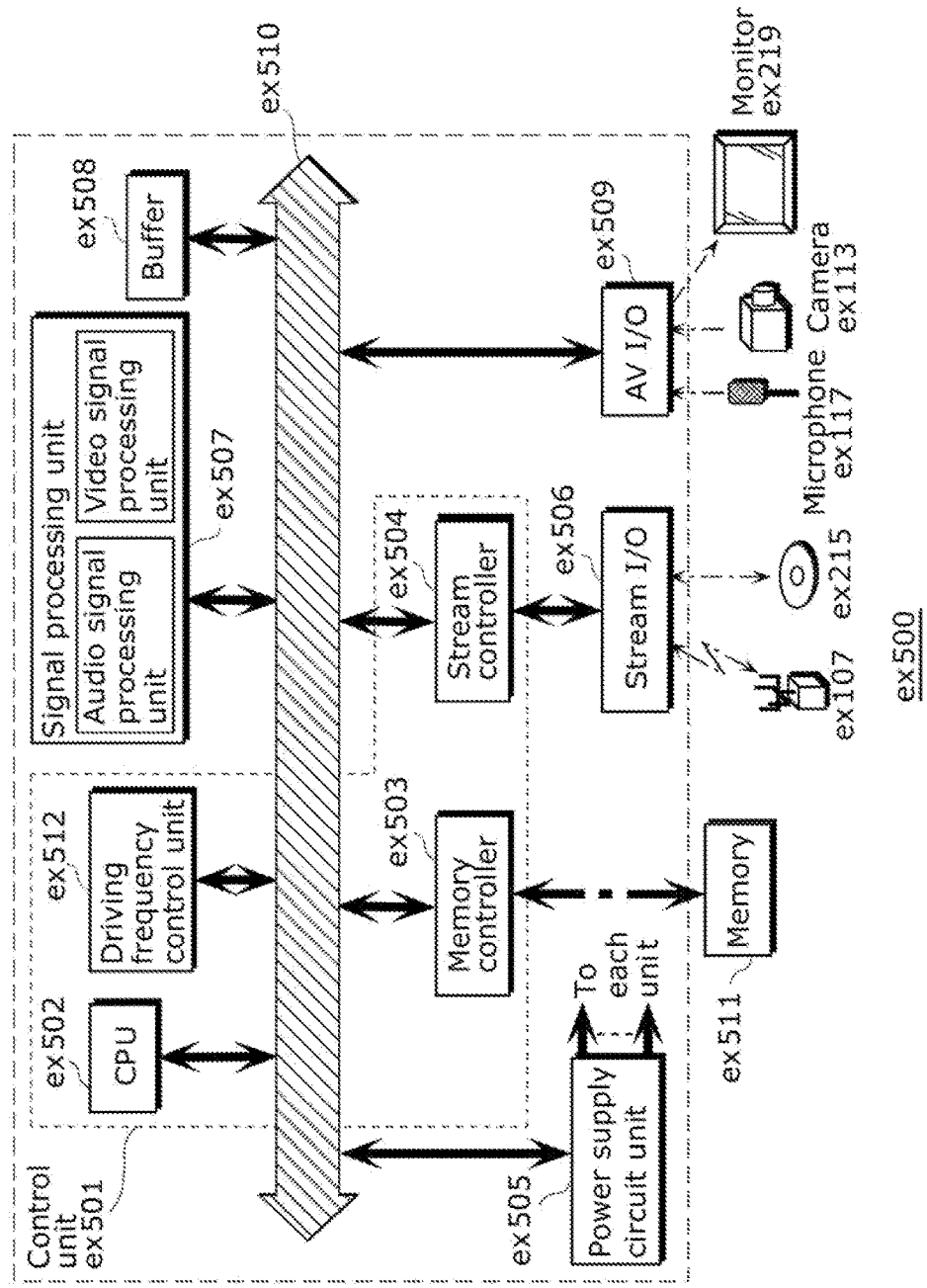
FIG. 31 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 8

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, there is a problem that the power consumption increases when the driving frequency is set higher.

Figure 32:
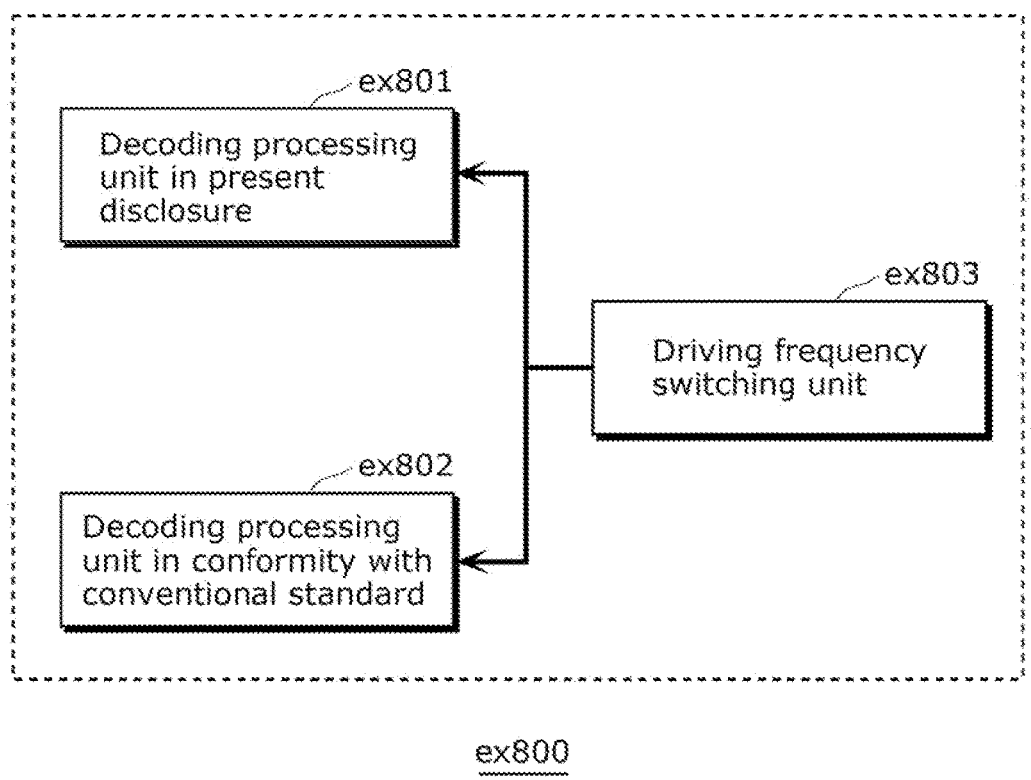
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 6 is probably used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
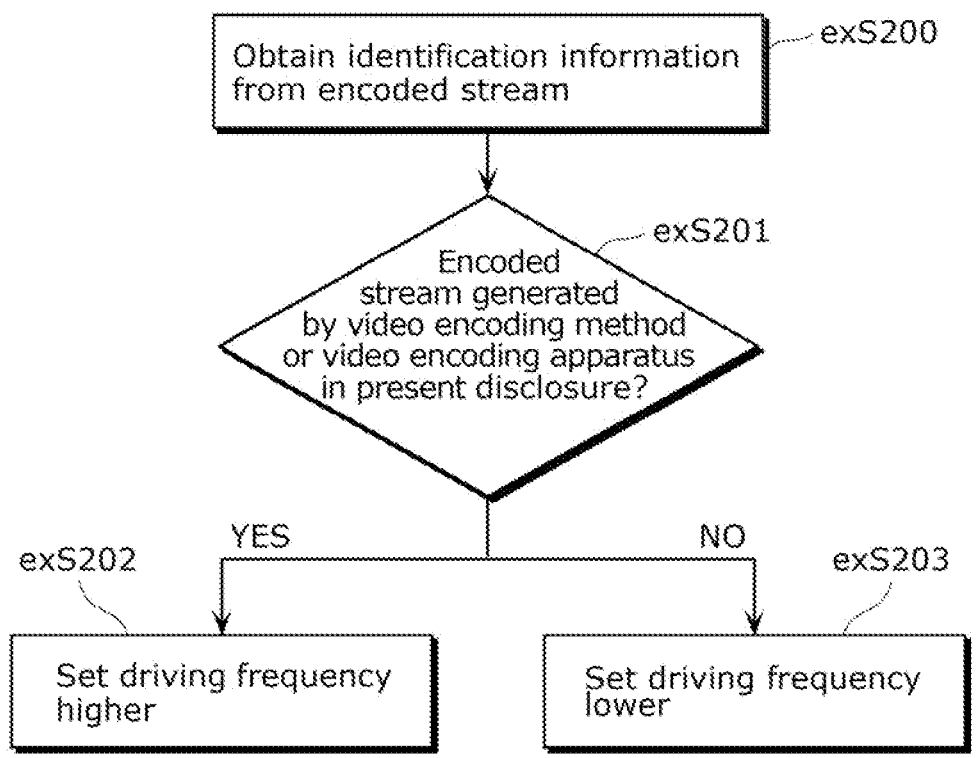
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
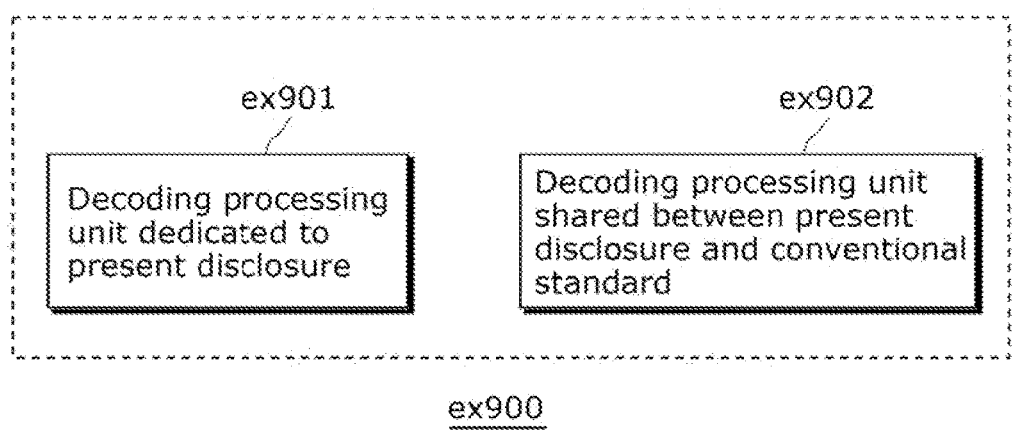
FIG. 35A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by motion compensation in particular, for example, the dedicated decoding processing unit ex901 is used for motion compensation. Otherwise, the decoding processing unit is probably shared for one of the entropy decoding, deblocking filtering, and inverse quantization, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
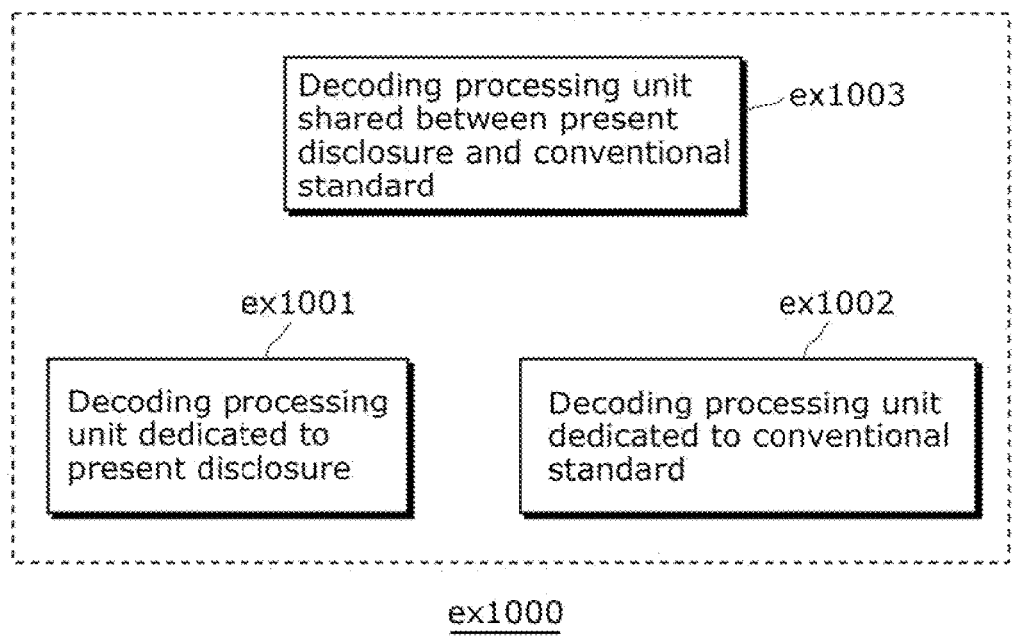
FIG. 35B is a diagram showing another example of a configuration for sharing a module of the signal processing unit.

Furthermore, ex1000 in FIG. 35B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image encoding device, the image decoding device, and the image encoding and decoding device, and the methods thereof according to one or more exemplary embodiments disclosed herein are applicable to, for example, television receivers, digital video recorders, car navigation systems, mobile telephones, digital cameras, digital video cameras, etc.

The invention claimed is:

1. An image encoding method for encoding, on a per field basis, a plurality of pictures classified into a plurality of layers for which reference from a picture belonging to a higher layer to a picture belonging to a lower layer is prohibited, the plurality of pictures including at least one picture that is encoded as a temporal sub-layer access (TSA) picture for which predetermined reference is prohibited, the image encoding method comprising:
   determining whether a current picture included in the plurality of pictures is the TSA picture;
   encoding the plurality of pictures according to whether the current picture is the TSA picture; and
   encoding a picture type indicating whether the current picture is the TSA picture,
   wherein the determining includes determining the current picture to be the TSA picture when the current picture does not belong to a highest layer in the plurality of layers and corresponds to a first field that is encoded earlier than a second field in a pair of fields in a frame.

2. An image decoding method for decoding, on a per field basis, a plurality of pictures classified into a plurality of layers for which reference from a picture belonging to a higher layer to a picture belonging to a lower layer is prohibited, the plurality of pictures including at least one picture that is decoded as a temporal sub-layer access (TSA) picture for which predetermined reference is prohibited, the image decoding method comprising:
   identifying whether a current picture included in the plurality of pictures is the TSA picture;

decoding the plurality of pictures according to whether the current picture is the TSA picture; and decoding a picture type indicating whether the current picture is the TSA picture;

wherein the identifying includes identifying the current picture as the TSA picture according to the decoded picture type when the current picture does not belong to a highest layer in the plurality of layers and corresponds to a first field that is decoded earlier than a second field in a pair of fields in a frame.

3. An image encoding device which encodes, on a per field basis, a plurality of pictures classified into a plurality of layers for which reference from a picture belonging to a higher layer to a picture belonging to a lower layer is prohibited, the plurality of pictures including at least one picture that is encoded as a temporal sub-layer access (TSA) picture for which predetermined reference is prohibited, the image encoding device comprising:

a determining unit configured to determine whether a current picture included in the plurality of pictures is the TSA picture; and an encoding unit configured to encode the plurality of pictures according to whether the current picture is the TSA picture, wherein the encoding unit is configured to encode a picture type indicating whether the current picture is the TSA picture, and the determining unit is configured to determine the current picture to be the TSA picture when the current picture does not belong to a highest layer in the plurality of layers and corresponds to a first field that is encoded earlier than a second field in a pair of fields in a frame.

4. An image decoding device which decodes, on a per field basis, a plurality of pictures classified into a plurality of layers for which reference from a picture belonging to a higher layer to a picture belonging to a lower layer is prohibited, the plurality of pictures including at least one picture that is decoded as a temporal sub-layer access (TSA) picture for which predetermined reference is prohibited, the image decoding device comprising:

an identifying unit configured to identify whether a current picture included in the plurality of pictures is the TSA picture; and a decoding unit configured to decode the plurality of pictures according to whether the current picture is the TSA picture, wherein the decoding unit is configured to decode a picture type indicating whether the current picture is the TSA picture, and the identifying unit is configured to identify the current picture as the TSA picture according to the decoded picture type when the current picture does not belong to a highest layer in the plurality of layers and corresponds to a first field that is decoded earlier than a second field in a pair of fields in a frame.

* * * * *